United States Patent
Aggarwal et al.

(10) Patent No.: US 11,017,203 B1
(45) Date of Patent: May 25, 2021

(54) UTILIZING SENSOR DATA FOR AUTOMATED USER IDENTIFICATION

(71) Applicant: Amazon Technologies, Inc., Seattle, WA (US)

(72) Inventors: Manoj Aggarwal, Seattle, WA (US); Jason Garfield, Seattle, WA (US); Korwin Jon Smith, Seattle, WA (US); Jordan Tyler Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/446,323

(22) Filed: Jun. 19, 2019

(51) Int. Cl.
 *G06K 9/00* (2006.01)
 *G06K 9/62* (2006.01)

(52) U.S. Cl.
 CPC ..... *G06K 9/00087* (2013.01); *G06K 9/00067* (2013.01); *G06K 9/6215* (2013.01)

(58) Field of Classification Search
 CPC ............. G06K 9/00087; G06K 9/6215; G06K 9/00067
 See application file for complete search history.

(56) References Cited

U.S. PATENT DOCUMENTS

| | | | |
|---|---|---|---|
| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 2012/0013436 | A1 | 1/2012 | Niinuma |
| 2013/0284806 | A1 | 10/2013 | Margalit |
| 2017/0255815 | A1 | 9/2017 | Matsunami |
| 2018/0075282 | A1 | 3/2018 | Chen et al. |

OTHER PUBLICATIONS

Marcialis, et al., "Why Template Self-Update Should Work in Biometric Authentication Systems?" 11th International Conference on Information Science, Signal Processing and their Applications: Special Sessions, 2012, pp. 1086-1091.

*Primary Examiner* — Christopher Wait
(74) *Attorney, Agent, or Firm* — Lee & Hayes, P.C.

(57) ABSTRACT

This disclosure describes techniques for identifying users that are enrolled for use of a user-recognition system and updating enrollment data of these users over time. To enroll in the user-recognition system, the user may initially scan his or her palm. The resulting image data may later be used when the user requests to be identified by the system by again scanning his or her palm. However, because the characteristics of user palms may change over the time, the user-recognition system may continue to build more and more data for use in recognizing the user, in addition to removing older data that may no longer accurately represent current characteristics of respective user palms.

20 Claims, 16 Drawing Sheets

UTILIZING SENSOR DATA FOR AUTOMATED USER IDENTIFICATION

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize various types of sensors to allow users to acquire and pay for items without cashiers or dedicated self-checkout stands. In some examples, it may be desirable to identify customers using methods that do not require the use of physical objects and charge the appropriate customer accounts for items taken from the physical stores by the customers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
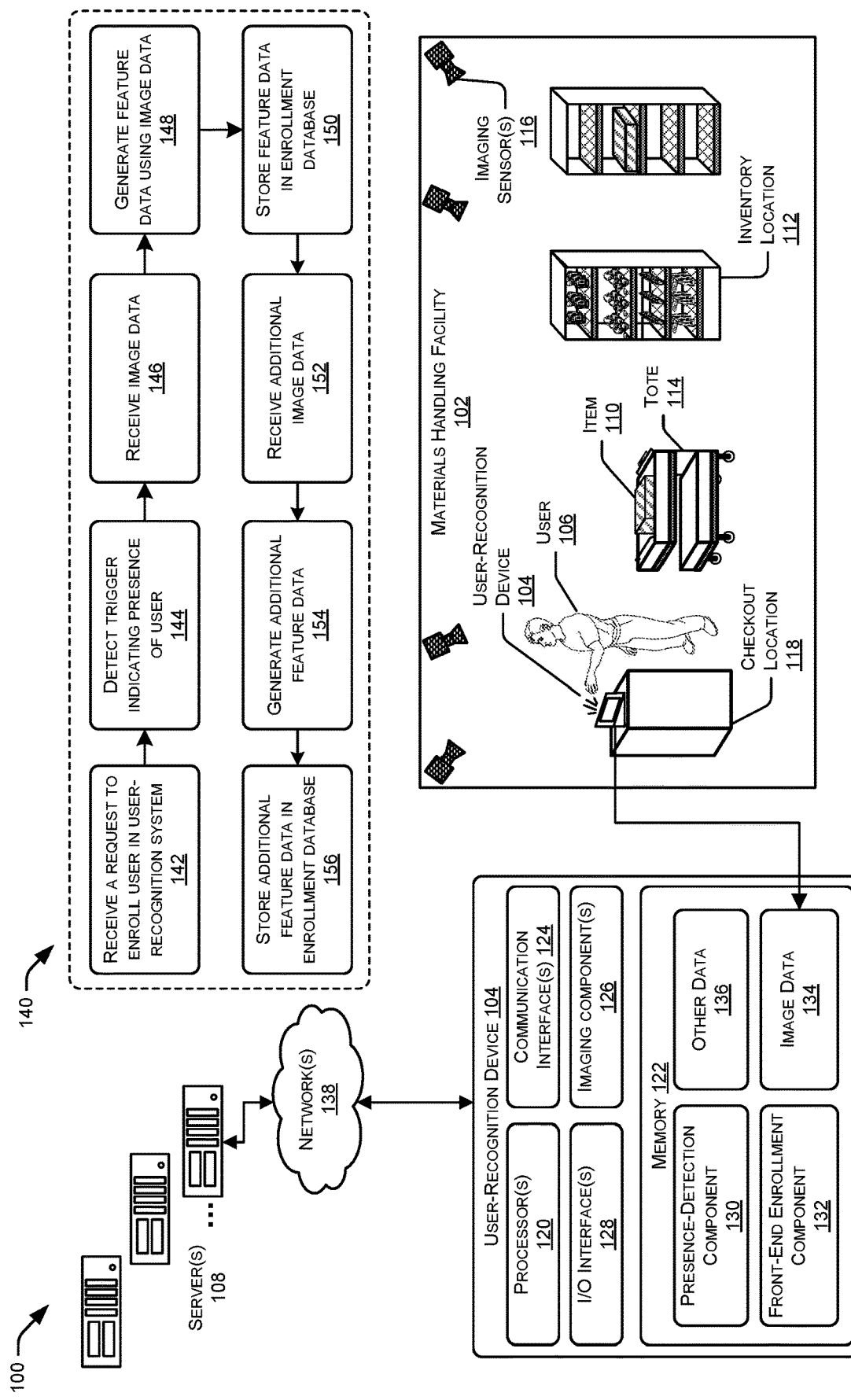
FIG. 1 illustrates an example environment that includes a user-recognition device to determine that a user would like to enroll with a user-recognition system. In this example, the user-recognition device generates image data corresponding to a palm of the user and sends the image data to one or more servers to enroll the user in the user-recognition system. In addition, the servers may update the enrollment of the user over time to reflect potential changes in characteristics of the user's palm over time.

This disclosure describes systems and techniques for identifying users using biometric-recognition techniques. As described below, users may enroll with a user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility.

In one illustrative example, the systems and techniques are used to recognize or identify users within a materials handling facility, which may include, or have access to, an inventory-management system. The inventory-management system may be configured to maintain information about items, users, condition of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system and charging a user account for that user with the cost of the items included in their virtual shopping cart. According to the techniques described herein, a user enrolled with the user-recognition system may need only provide biometric information by, for example, scanning a palm of the user at an imaging device, scanning a fingerprint of the user, looking at a camera of a user-recognition device located in the facility, or the like in order to be identified by the user-recognition system.

To utilize the user-recognition system, a user may request to be enrolled by interacting with a user-recognition device positioned in a facility. For example, the user may select an enroll option on a display of the user-recognition device, issue a voice or GUI-based command requesting to be enrolled, insert a user ID card into the user-recognition device, and/or simply present their hand or palm before the user-recognition device to prompt the enrollment process.

Upon requesting to be enrolled in the user-recognition system, the user-recognition device may, with permission and/or upon explicit request by the user, begin collecting various types of biometric data, and/or other data, for the user. For example, the user-recognition device may include one or more imaging sensors (e.g., a camera) that begins capturing image data (e.g., an individual image, a sequence of images, a video, etc.) of at least a portion of the user, such as a palm of the user, a face of the user, or the like. In the example of the palm, the user-recognition device may request that the user move their hand to different angles and/or orientations as the device captures the image data and may also capture image data under different lighting conditions (e.g., no flash, flash, different light polarizations, etc.), to generate image data representing the palm of the user under different environmental conditions.

In some examples, the user may already have an account registered with the inventory-management system to pay for items selected during a shopping session. In such examples, the user-recognition device may determine a user account with which the user is registered in various ways, such as by requesting that the user insert a personal ID card (e.g., driver's license), scan a barcode that may be presented on a display of a phone of the user, login with his or her login credentials, and so forth.

Once the user-recognition device has obtained the image data representing the palm or other portion of the user, the user-recognition device may utilize this data to enroll the user with the user-recognition system. In some examples, the user-recognition system may be implemented entirely on the user-recognition device, which may include the software, firmware, and/or hardware components to implement the techniques described herein. However, in some examples, the user-recognition system may be implemented according to a split architecture where the user-recognition device performs client-side enrollment and identification techniques, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the user-recognition device may send the image data, and/or feature data generated by the user recognition device using the image data, to the network-based devices to enroll the user for the user-recognition system. The network-based devices of the user-recognition system may perform various processing techniques on the image data and/or feature data such that the user-recognition system is able to identify the user from subsequently received image data and/or feature data.

The user-recognition system may analyze the image data to determine various features of the user. For example, the user-recognition system may extract and/or generate, based on the image data, palm-feature data representing the palm of the user. This palm-feature data may represent information that is potentially unique to the palm of the user, such as the pattern of creases in the user's palm, the pattern of veins of the user's palm, the geometry of one or more portions of the user's hand (e.g., finger sizes/shape, palm size/shape, etc.), and/or the like. The user-recognition system may utilize any type of processing techniques to generate the palm-feature data and may represent the palm of the user depicted in the image data using various types of data structures, such as feature vectors. In some examples, the user-recognition system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

Upon obtaining the feature data that represents the palm of the user, the user-recognition system may store the feature data in an enrollment database and associate the feature data with a user profile for that specific user. In this way, when subsequent image data is received for a user at a user-recognition device, the feature data stored in the enrollment database may be compared with the feature data generated from the subsequent image data to identify a user profile for the user represented in the subsequent image data and audio data.

In this way, the user may be enrolled for use of the user-recognition system such that, after completing subsequent shopping sessions, the user may checkout by placing his or her palm over an imaging component of a user-recognition device to allow the user-recognition system to automatically recognize the user. The user-recognition device may detect the presence of the user (e.g., detect the palm, detect a face, detect the speech utterance, detect a touch input via a touch display, etc.), and begin streaming image data and audio data to the backend devices of the user-recognition system. The backend devices of the user-recognition system may then utilize the trained model(s) to extract feature data and compare that feature data to stored feature data for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

In some instances, the look and/or makeup of user palms may change over time (e.g., due to callouses, scars, etc.) and, thus, the palm-feature data associated with respective user profiles may need to be updated over time to allow for accurate identification. Further, in some instances the palm-feature data or other biometric-based data stored by the user-recognition system may need to be removed from the system after a threshold amount of time after generating or receiving the data to comply with regulatory requirements. Thus, the user-recognition system may again update the palm-feature data over time to allow older data to be removed while still enabling the system to identify the respective users.

To maintain an accurate and/or current representation of the palm of the user, the user-recognition system may update the palm-feature data using image data, such as recently obtained image data, of the user. In some instances, the user-recognition system may collect and store image data for each occurrence of the user utilizing the user-recognition system, and periodically (e.g., every three months, every six months, etc.) utilize at least a portion of those images to update the palm-feature data stored in the enrollment database for the user. In some examples, the user-recognition system may update the palm-feature data upon detecting a significant change in the features of the palm of the user. By updating the palm-feature data using image data that is more recently obtained, the user-recognition system may maintain a more accurate representation of the enrolled users in order to more accurately identify enrolled users over time.

In some instances, the user-recognition system may store, for an individual user, multiple pieces of image data or palm-feature data corresponding to image data captured at different points in time. For instance, when a specific user first enrolls with the user-recognition system, the system may store, in association with a profile of the user, at least one of the image data of the user's palm and/or palm-feature data generated based on the image data. Therefore, when the user returns to a facility that utilizes the user-recognition system for identification and provides image data of the palm of the user, the palm-feature data generated using this new image data may be compared to the stored palm-feature data to determine when the user at the facility corresponds to the user associated with the profile. It is to be appreciated that this new palm-feature data may be compared to palm-feature data associated with multiple different user profiles for identifying the user.

Upon identifying the user by determining that the new palm-feature data corresponds to stored palm-feature data associated with a particular user profile, the user-recognition service may determine that the user at the facility corresponds to the user associated with the particular user profile. In addition to making this identification, however, the user-recognition may also store this new image data and/or the palm-feature data generated from this new image data in association with the user profile for later use in again identifying the user.

Therefore, envision that the same user again visits this facility or a different facility at still a later date. Upon the user scanning his or her palm using the user-recognition device at the facility, the user-recognition system may attempt to identify the user with reference to both the initial palm-feature data and the more-recent palm-feature data generated from the image data taken at the user's last visit to the (same or different) facility. Therefore, the user-recognition system may compare the newest palm-feature data to richer feature data, thus increasing the accuracy of the resulting recognition. Again, it is to be appreciated that the user-recognition may continue to update the enrollment data (e.g., palm-feature data) for each of multiple user profiles, such that the most-recently generated palm-feature data is compared to rich data across multiple different profiles.

In addition, the user-recognition system may remove older palm-feature data as the system continues to add most-recent feature data as enrollment data associated with a user profile. Continuing the example from above where the user initially enrolled with the system at a first time and thereafter visited the same or a different facility associated with the user-recognition system two times, the initial palm-feature data may be removed from the enrollment data associated with the corresponding user profile. Instead, the palm-feature data associated with the most recent two visits to the facilitie(s) may now be stored as the enrollment data for the user. Of course, while the above example describes removing the initially provided palm-feature data, in some instances the user-recognition system may employ weighting techniques with a sliding window to lessen the affect that older feature data has relative to newer feature data in terms of identifying users. Stated otherwise, the user-recognition may employ decay functions that cause the impact of older feature data on user recognition to decay over time.

In addition to updating the feature data associated with user profiles over time, in some instances the user-recognition system may perform periodic or continuous audits of the system to identify potential matching errors, to correct the errors, and to retrain the system for increased future accuracy. For example, in some instances the user-recognition system may employ a first level of matching in order to identify a user upon a user entering a facility and scanning his or her palm. This first level of matching may be performed locally at the user-recognition device or at one or more network-based devices associated with the user-recognition system. Regardless, after making an initial determination of the user based on the first level of matching, the user-recognition system may employ a second, more advanced level of matching at a later time. That is, the system may use additional computing resources to cross-match the newly generated palm-feature data against even more stored palm-feature data. If the system identifies an error, the system may correct the error and use information regarding the error and the correct match to retrain one or more trained models used by the system.

To provide an example, envision that a user enters a facility and scans his or her palm. Upon generating palm-feature data associated with image data of the palm, the user-recognition system may compare this feature data to, for example, a single piece of palm-feature data associated with a first user profile, a single piece of palm-feature data associated with a second user profile, and so forth. Envision that, based on this analysis, the user-recognition determines that the user corresponds to the first user profile. Thus, the system may store an indication that any transaction that occurs within the facility by the user is to be associated with the first user profile.

At a later time, however, the system may perform a deeper analysis. For example, the user-recognition system may compare the palm-feature data of the user with multiple pieces of palm-feature data associated with the first user profile, multiple pieces of palm-feature data associated with the second user profile, and so forth. Thereafter, the user-recognition system may determine that the palm-feature data actually corresponds to the second user profile rather than the first user profile. As such, the user-recognition system may store an association between the palm feature data and the second user profile and may remove the association between the palm feature data and the first user profile. The user-recognition system may also use the information associated with the initial error and the information associated with the new match to retrain one or more trained models employed for user identification.

In some instances, the user-recognition system may utilize different types of biometric and/or other types of information for identifying users. For example, a user may provide palm data, facial-recognition data, voice data, user ID/password data, and/or any other type of information that may be used to identify the user. To provide an example, a user may initially enroll with the user-recognition system may, for example, provide an image of a palm of the user. The system may associate the resulting feature data with an account of the user. In addition, the user may later provide additional information, such as facial-recognition data, which may also be associated with the user account. Therefore, when the user later requests that the user-recognition system identify the user, the user may scan his or her palm, provide an image of his or her face, and/or the like. The user-recognition system may then use whichever type or types of information that is provided to identify the user. Furthermore, as the user continues to engage with the user-recognition system over time, the user-recognition may continue to update enrollment data associated with the user as described below, potentially to include additional types of biometric data provided by the user over time.

In some instances, the user-recognition system may perform auditing processes on a periodic basis, such as nightly, weekly, or the like. In addition, or in the alternative, the user-recognition system may perform auditing processes in response to receiving user feedback, such as in response to a user indicating that he or she objects to a transaction or a match determined by the system. In still other instances, the system may perform auditing processes in response to a user being identified more or less than a threshold number of times within a certain amount of time, in response to a large transaction, in response to a transaction associated with a large number of items, in response to learning additional information regarding a user (e.g., that a user was not located at a city or state associated with a facility at which he or she was allegedly identified), or in response to occurrence of any other predefined event. In some instances, after receiving user feedback (e.g., in the form of a user indicating that he or she objects to a transaction or a match determined by the system), the user-recognition system may perform a higher level of analysis to determine whether image data associated with the transaction was misidentified. In some instances, if the system is unable to confirm with a threshold level of confidence whether it was or was not misidentified, then the user-recognition system may send the image data (potentially along with other relevant data) to a computing device associated with a human associate for analysis by the human associate. The human associate may visually compare the image data to image data associated with the user in question and, potentially other users, to determine whether the image data was misidentified.

Further, while the above example describes an example where the user-recognition system corrects an error, potentially in response to user feedback, in other instances the user-recognition system may confirm its original conclusion. For example, envision that a user states that he or she was charged for a transaction that he or she did not participate in. In response, the user-recognition system may perform a rich auditing process by comparing the palm-feature data associated with the visit in question to a large amount of palm-feature data associated with a user profile of that user and with other user profiles. Rather than identify an error, in some instances the user-recognition system may confirm the initial identification and, thus, the feedback from the user indicating he or she did not participate in the transaction may be deemed fraudulent.

Although the techniques described herein are primarily with reference to identifying users for the purpose of identifying a user account to charge for items selected from a materials handling facility, the techniques are equally applicable to any industry in which user recognition may be helpful. For instance, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes a user-recognition device 104 to determine that a user would like to enroll for use of a user-recognition system. In this example, the user-recognition device 104 generates image data depicting a palm of a user 106 and sends the image data to one or more backend servers 108 to be used to enroll the user for use of the user-recognition system. Generally, the user-recognition system may include the user-recognition device 104 and/or the server(s) 108.

In some instances, some or all of the user-recognition system resides remotely from the materials handling facility 102, while in other instances some or all of the user-recognition system resides within or proximate to the materials handling facility 102. As FIG. 1 depicts, the user 106 may have engaged in, or be about to engage in, a shopping session in the materials handling facility 102. For instance, the user 106 may have selected an item 110 from an inventory location 112 (e.g., shelf, aisle, etc.) and placed the item 110 in a tote 114 (e.g., shopping cart). The inventory location 112 may house one or more different types of items 110 and the user 106 may pick (i.e., take) one of these items 110.

As illustrated, the materials handling facility 102 (or "facility") may include one or more sensors, such as the illustrated imaging sensors 116, and/or an array of other sensors located on or near the inventory location(s) 112. In this example, the imaging sensor(s) 116 are configured to capture video data within the facility 102 for use in determining results associated with events, such as the picking of the item 110 by the user 106. While FIG. 1 illustrates various example sensors, the sensors in the facility 102 may comprise any other type of sensor, such as weight sensors (e.g., load cells), microphones, and/or the like, as described in detail below. As described in more detail with respect to FIGS. 12 and 13, the facility 102 may be monitored and/or otherwise associated with an inventory-management system configured to determine events in the facility 102 associated with the user 106, such as taking items 110 that the user 106 would like to purchase. The inventory-management system may track the items 110 selected by the user 106 and maintain a virtual shopping cart which includes all of the items 110 taken by the user 106. Thus, when a user 106 would like to leave the facility 102 with the items 110 they have taken, the inventory-management system may charge a user account associated with the user 106 for the cost of the items 110 that were taken.

As shown in FIG. 1, the user 106 may approach a checkout location 118 associated with the user-recognition device 104. The user 106 may determine that they would like to enroll for use of a user-recognition system in order to checkout of the facility 102 and pay for their item(s) 110. Alternatively, or additionally, the user may interact with the user-recognition device 104 upon entering the facility 102. In either instance, the user 106 may determine that they would like the user-recognition system to collect data that is usable to identify the user 106. This data may be utilized by the user-recognition system such that, once enrolled, the user 106 need only scan his or her palm to be identified by the user-recognition system in order to charge their user account with the purchase of their item(s) 110.

FIG. 1 illustrates an example enrollment process 140 that describes, at a high level, techniques for enrolling the user 106 for use of the user-recognition system and for the user-recognition system updating the enrollment of the user 106 over time. The user-recognition device 104 may comprise components for performing at least a portion of the techniques of the enrollment process 140, as may the servers. Components of the servers 108 are described in further detail below with reference to subsequent figures. For example, the user-recognition device 104 may comprise one or more processors 120 configured to power components of the device 104 and may further include memory 122 which stores components that are at least partially executable by the processor(s) 120, as well as other data. For example, the memory 122 may include a presence-detection component 130 to detect the presence of a user 106 and a front-end enrollment component 132 configured to perform various operations for enrolling the user 106 for use of the user-recognition system.

At 142, the front-end enrollment component 132 may receive a request to enroll the user 106 for use of the user-recognition system. The request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

In some examples, at 144 of the enrollment process 140, the presence-detection component 130 may be executable by the processor(s) 120 to detect a trigger indicating presence of the user 106. The trigger detected by the presence-detection component 130 may comprise one or more types of input. For instance, the presence-detection component 130 may include logic to detect, using one or more imaging components 126, a palm of the user 106 over or proximate to the user-recognition device 104. Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130 at 144. In some examples, the trigger detection at 144 may not be performed, or may be included in or the same as receiving the request to enroll.

After receiving the request to enroll from the user 106, the front-end enrollment component 132 may, at 146, begin generating image data 134 using one or more imaging component(s) 126 (e.g., cameras). For instance, the front-end enrollment component 132 may utilize the imaging component(s) 126 to obtain image data 134 such as an image or picture, a sequence of consecutive images, and/or video data. The image data 134 may represent the palm of the user 106 and may be used to identify creases in the palm, veins in the palm, geometric information regarding the palm and other parts of the hand or the user 106 and/or the like. Once the front-end enrollment component 132 has obtained the image data 134 representing the palm or other portion of the user 106, the user-recognition device 104 may send (e.g., upload, stream, etc.) the image data 134 to the servers 108 over one or more networks 138 using one or more communication interfaces 124.

The network(s) 138 may include private networks such as an institutional or personal intranet, public networks such as the Internet, or a combination thereof. The network(s) 138 may utilize wired technologies (e.g., wires, fiber optic cable, and so forth), wireless technologies (e.g., radio frequency, infrared, acoustic, optical, and so forth), or other connection technologies. The network(s) 138 is representative of any type of communication network, including one or more of data networks or voice networks. The network(s) 138 may be implemented using wired infrastructure (e.g., copper cable, fiber optic cable, and so forth), a wireless infrastructure (e.g., cellular, microwave, satellite, etc.), or other connection technologies.

The communication interface(s) 124 may include devices configured to couple to personal area networks (PANs), wired and wireless local area networks (LANs), wired and wireless wide area networks (WANs), and so forth. For example, the communication interfaces 124 may include devices compatible with Ethernet, Wi-Fi™, and so forth. In some examples, the communication interface(s) 124 may encode the image data 134 and/or other data 136 generated by the user-recognition device 104 prior to sending over the network(s) 138 according to the type of protocol or standard being used.

Upon receiving the image data, one or more components of the back-end servers 108 may generate feature data using the image data. This feature data may be in a vector form and may represent characteristics about the user's palm that may be used to differentiate the palm from other user palms. It is to be appreciated that while this process 140 describes the servers 108 generating the feature data, in other instances the user-recognition device 104 may be configured to generate the feature data and may send the feature data, in addition to or rather than the image data 134, to the servers.

At 150, one or more components of the servers 108 store the feature data in an enrollment database in association with a user profile of the user 106. That is, this palm-feature data is stored such that it may be compared to feature data generate from subsequent image data for later identification of the user 106 at the facility 102 or other facilities that are associated with the user-recognition system.

At 152, the imaging components 126 receive additional image data of the palm of the user 106, such as at a time when the user 106 has returned to the facility 102 at a later data. After the servers 108 receive the additional image data from the user-recognition device 104, the servers may generate additional feature data based on the additional image data. At this point, one or more components of the servers 108 may compare the additional feature data to feature data stored in respective user profiles for the purpose of identifying the user associated with the additional image data. In this example, the user-recognition system compares the additional feature data generated at 154 with the feature data generated at 148 and stored in association with the user profile of the user 106 and, thus, determines that the additional image data corresponds to the user 106. In some instances, in addition to identifying the user 106, the user-recognition system may then store the additional feature data in the enrollment database in association with the user profile of the user 106, as illustrated at 156. Therefore, this additional feature data, potentially along with the initial feature data, may be used for later identification of the user 106. Furthermore, as introduced above and discussed in further detail below, in some instances the user-recognition may remove or otherwise lessen the impact of older feature data over time such that more recent feature data associated with the user 106 is used more heavily (or exclusively) to identify the user 106.

Figure 2:
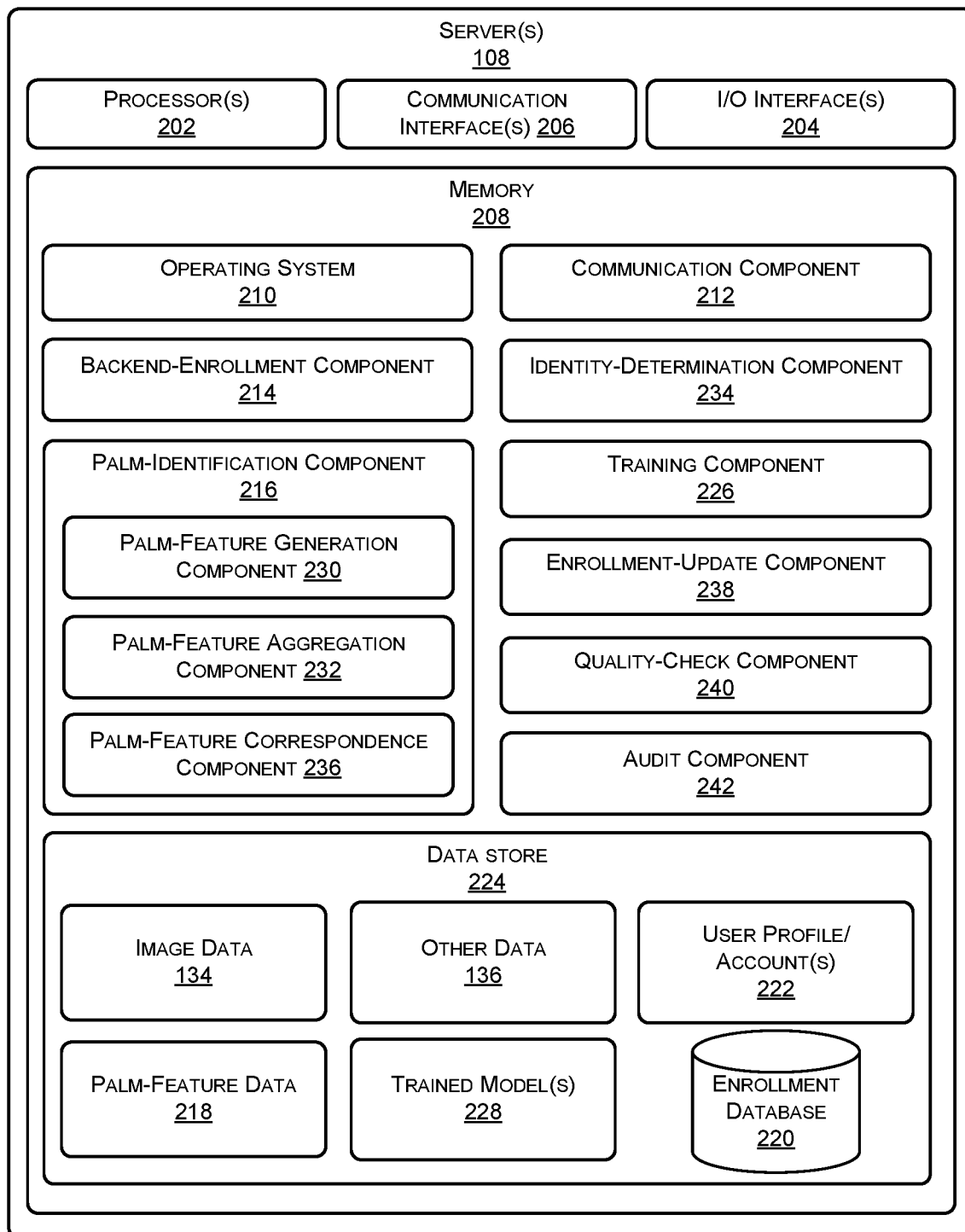
FIG. 2 illustrates example components of one or more servers configured to support at least a portion of the functionality of a user-recognition system.

FIG. 2 illustrates example components of one or more servers 108 configured to support at least a portion of the functionality of a user-recognition system. In some examples, the user-recognition system described herein may be supported entirely, or at least partially, by the user-recognition device 104 in conjunction with the servers 108. The server(s) 108 may be physically present at the facility 102, may be at a remote location accessible by the network 138, or a combination of both. The server(s) 108 do not require end-user knowledge of the physical location and configuration of the system that delivers the services. Common expressions associated with the server(s) 108 may include "on-demand computing," "software as a service (SaaS)," "cloud services," "data centers," and so forth. Services provided by the server(s) 108 may be distributed across one or more physical or virtual devices.

The server(s) 108 may include one or more hardware processors 202 (processors) configured to execute one or more stored instructions. The processors 202 may comprise one or more cores. The server(s) 108 may include one or more input/output (I/O) interface(s) 204 to allow the processor 202 or other portions of the server(s) 108 to communicate with other devices. The I/O interfaces 204 may comprise Inter-Integrated Circuit (I2C), Serial Peripheral Interface bus (SPI), Universal Serial Bus (USB) as promulgated by the USB Implementers Forum, RS-232, and so forth.

The server(s) 108 may also include one or more communication interfaces 206. The communication interfaces 206 are configured to provide communications between the server(s) 108 and other devices, such as the user-recognition device 104, the interface devices, routers, and so forth. The communication interfaces 206 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server(s) 108 may also include one or more busses or other internal communications hardware or software that allow for the transfer of data between the various modules and components of the server(s) 108.

As shown in FIG. 2, the server(s) 108 includes one or more memories 208. The memory 208 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 208 provides storage of computer-readable instructions, data structures, program modules, and other data for the operation of the server(s) 108. A few example functional modules are shown stored in the memory 208, although the same functionality may alternatively be implemented in hardware, firmware, or as a system on a chip (SOC).

The memory 208 may include at least one operating system (OS) 210. The OS 210 is configured to manage hardware resource devices such as the I/O interfaces 204, I/O devices, the communication interfaces 206, and provide various services to applications or modules executing on the processors 202. The OS 210 may implement a variant of the FreeBSD™ operating system as promulgated by the Free-BSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 208. These modules may be executed as foreground applications, background tasks, daemons, and so forth.

A communication component 212 may be configured to establish communications with one or more of the imaging sensors 116, the user-recognition devices 104, other server(s) 108, or other devices. The communications may be authenticated, encrypted, and so forth.

A backend-enrollment component 214 may be configured to perform various operations for enrolling a user 106 for use of the user-recognition system. For instance, the backend-enrollment component 214 may perform various operations, and/or cause other components to perform various operations, to enroll users 106 in the user-recognition system. In some instance, the backend-enrollment component 214 may at least partly control a palm-identification component 216 that performs operations for analyzing image data 134 depicting a palm or other portion of the user 106. In some examples, the backend-enrollment component 214 may cause the palm-identification component 216 to analyze the image data 134 and extract features which represent a palm of the user 106, such as palm-feature data 218.

After obtaining, determining, and/or generating the palm-feature data 218, the backend-enrollment component 214 may enroll the user 106 in an enrollment database 220 which indicates that the user 106 is enrolled for use of the user-recognition system. In some examples, the backend-enrollment component 214 may associate, or map, the various data to a user profile/account 222 that is associated with the user 106. For example, the backend-enrollment component 214 may map, for each enrolled user 106, respective palm-feature data 218 to corresponding user profiles 222 in the enrollment database 220. Thus, the enrollment database 220 may store indications of user profiles 222, as well as the data for users 106 associated with each of the user profiles 222. When a user 106 is enrolled for use of the user-recognition system, the backend-enrollment component 214 may map, or store an association, between the user's 106 palm-feature data 218 with the user profile 222 for that user 106. Further, the user profile 222 may include various information for the user 106, such as payment information to perform transactions for items 110 selected by the user 106 from the facility 102. The various types of data discussed herein may be stored in a data store 224 in the memory 208 of the server(s) 108, as illustrated in FIG. 2.

Further, the backend-enrollment component 214 may cause a training component 226 to train one or more trained models 228. The training component 226 may utilize the palm-feature data 218 and the lip movement feature data 222 to train the trained model(s) 228 to perform various operations for extracting and/or generating, from the image data 134, palm-feature data 218. The trained model(s) 228 may comprise any type of model, such as machine-learning models, including but not limited to artificial neural networks, classifiers, decision trees, support vector machines, Bayesian networks, and so forth.

As a specific example, the trained model(s) 228 may include or comprise one or more convolution neural networks (CNNs), recursive neural networks, and/or any other artificial networks, that are trained to analyze image data 134 received as input, and extract, determine, identify, generate, etc., palm-feature data 218 representing a palm of the user 106. As a specific example, the palm-feature data 218 may comprise a 128-dimension feature vector representing the palm of the user 106. In examples where the trained model(s) 228 include one or more CNNs, various functions may be utilized to transform the image data 134 into a metric space, such as a triplet loss function. Thus, the training component 226 may train the CNNs of the trained model(s) 228 using various functions, such as a triplet loss function, to extract, identity, or otherwise determine palm-feature data 218 from input image data 134. Once in the metric space, extracted feature data may be compared, or matched, by computing a distance between the extracted feature data and feature data stored in the enrollment database 220. For instance, when feature data is extracted from the image data 134 into palm-feature data 218 by the trained model(s) 228, the extracted palm-feature data 218 may then be compared to stored data in the enrollment database 220 to identify a user profile for the user 106 represented in the input image data 134. For instance, the extracted palm-feature data 218 may comprise a vector that is compared with stored vectors in the enrollment database 220 to identify which stored vectors have the smallest "distance" between the extracted feature data. The smaller the distance, the closer the strength of correspondence between the extracted feature data and the stored feature data representing users 106 that are enrolled for use of the user-recognition system. In some examples, other calculations may be performed, such as finding a cosine of an angle between two vectors, depending on the network utilized by the trained model(s) 228. However, any type of models may be utilized for the trained model(s) 228.

The palm-identification component 216 may include various sub-components for performing various operations. For instance, the palm-identification component 216 may include a palm-feature generation component 230 to extract or otherwise generate feature data from the image data 134. The palm-feature generation component 230 may utilize the trained model(s) 228, and/or include algorithms, to perform any type of feature extraction method, or embedding, to analyze the image data 134 and extract the palm-feature data 218. For instance, the palm-feature generation component 230 may utilize state-of-the-art models, such as clustering, artificial neural networks, scale-invariant feature transform, edge detection, or any other type of extraction or embedding technology, to extract palm-feature data 218 from the image data 134.

The palm-identification component 216 may further include a palm-feature aggregation component 232 configured to aggregate feature data for a user 106. For instance, the palm-feature aggregation component 232 may combine palm-feature data 218 that has been extracted from a group of images depicting the user 106, such as by averaging the features in the palm-feature data 218.

Once a user 106 is enrolled for use of the user-recognition system, an identity-determination component 234 may be utilized to determine and/or verify an identity of a user 106 that interacted with a user-recognition device 104. For example, the server(s) 108 may receive image data 134 from a user-recognition device 104 and the identity-determination component 234 may be configured to determine an identity of the user 106, where the enrollment database 220 indicates the identity of the user 106 by, for example, indicating the user profile 222 that is associated with that user's identity.

The identity-determination component 234 may cause a palm-feature correspondence component 236 to perform various operations for determining or identifying a user 106 whose palm is depicted in the received image data 134. For example, the palm-feature correspondence component 236 may compare the palm-feature data 218 for the received image data 134 with palm-feature data 218 stored in the enrollment database 220 for different user profiles 222 of users 106 enrolled in the user-recognition system in order to determine user profiles 222 for one or more users 106 whose respective palm-feature data 218 correspond to the extracted palm-feature data 218. In some instances, the score calculated by the palm-feature correspondence component 236 may be compared to a threshold and, if the score is greater than the threshold, may result in identification of the user. If multiple user profiles are associated with scores that are greater than the threshold, then the user profile associated with the highest may be deemed to be associated with the image data 134 and/or further analysis may be performed to identify the appropriate user. Further, in some instances, the user-recognition system may employ set-reduction techniques to identify, based on an initial comparison, a top "N" group of user profiles 222 of users 106 whose respective palm-feature data 218 most strongly correspond to the extracted palm-feature data 218. In some examples, a single user identity/profile 222 may be determined as corresponding to the input palm-feature data 218. However, in some examples a group of top "N" candidates may be identified by the trained model(s) 228 as corresponding with a threshold amount of strength (e.g., 50% correspondence, 75% correspondence, etc.) to the extracted palm-feature data 218. A second level of deeper analysis may then be performed to identify a single user from the "N" candidates.

Further, the memory 208 may store an enrollment-update component 238 configured to update the palm-feature data 218 stored in association with user profiles to allow for removal of stale feature data and use of more recent feature data. As introduced above, as a user provides image data of the user's palm over time, the enrollment-update component 238 may use feature data from this new image data to generate and store additional feature data associated with the user. Further, the enrollment-update component 238 may remove or lessen a weight associated with older feature data. An example operation of the enrollment-update component 238 is described below with reference to FIGS. 3A-3B.

In addition, the memory 208 may store an audit component 242 configured to perform one or more auditing processes in response to occurrence of one or more predefined events. For example, the audit component 242 may perform a nightly auditing processes comprising rich comparison of palm-feature data associated with respective user profiles to one another to identify any errors previously made by the system. After identifying an error, the system may correct the error and may also this information to further train the trained model(s) 228 utilizing techniques similar to those performed by the backend-enrollment component 214. An example operation of the audit component 242 is described with reference to FIG. 6.

Additionally, the memory 208 may store a quality-check component 240 which determines an overall metric of the quality of the extracted palm-feature data 218. For instance, the quality-check component 240 may determine that additional image data 134 needs to be obtained for a user 106 for various reasons, such as a bandage or glove covering the palm of the user 106, or the like. In some examples, the quality-check component 240 may utilize a trained model(s) 228 to determine whether a feature vector is of sufficient quality and, if not, may cause the user-recognition device to request additional image data 134.

Figure 3A:
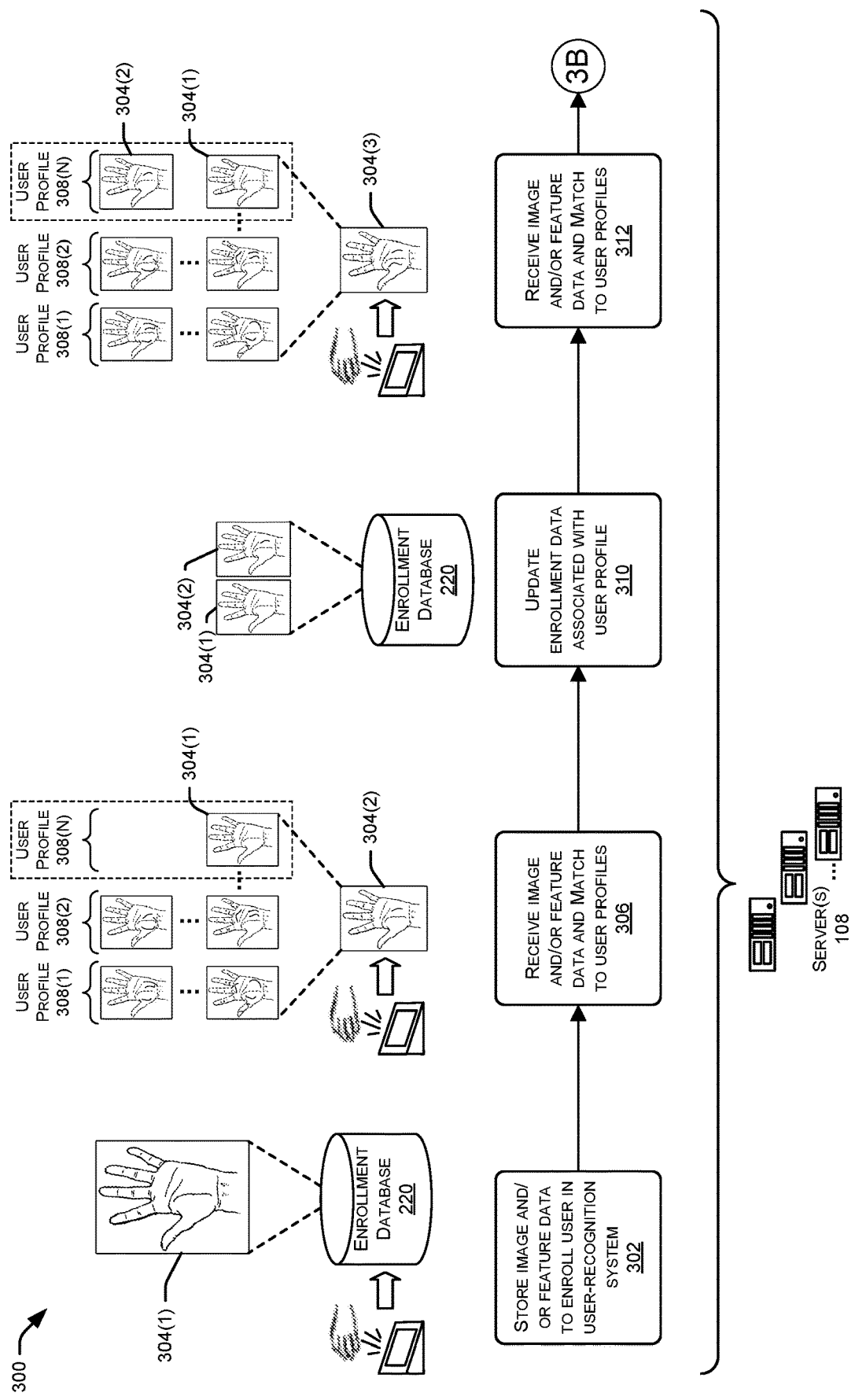
FIGS. 3A-3B collectively illustrate an example process for enrolling a user in the user-recognition system of FIG. 1, as well as identifying the user thereafter and updating the enrollment of the user over time.
Figure 3B:
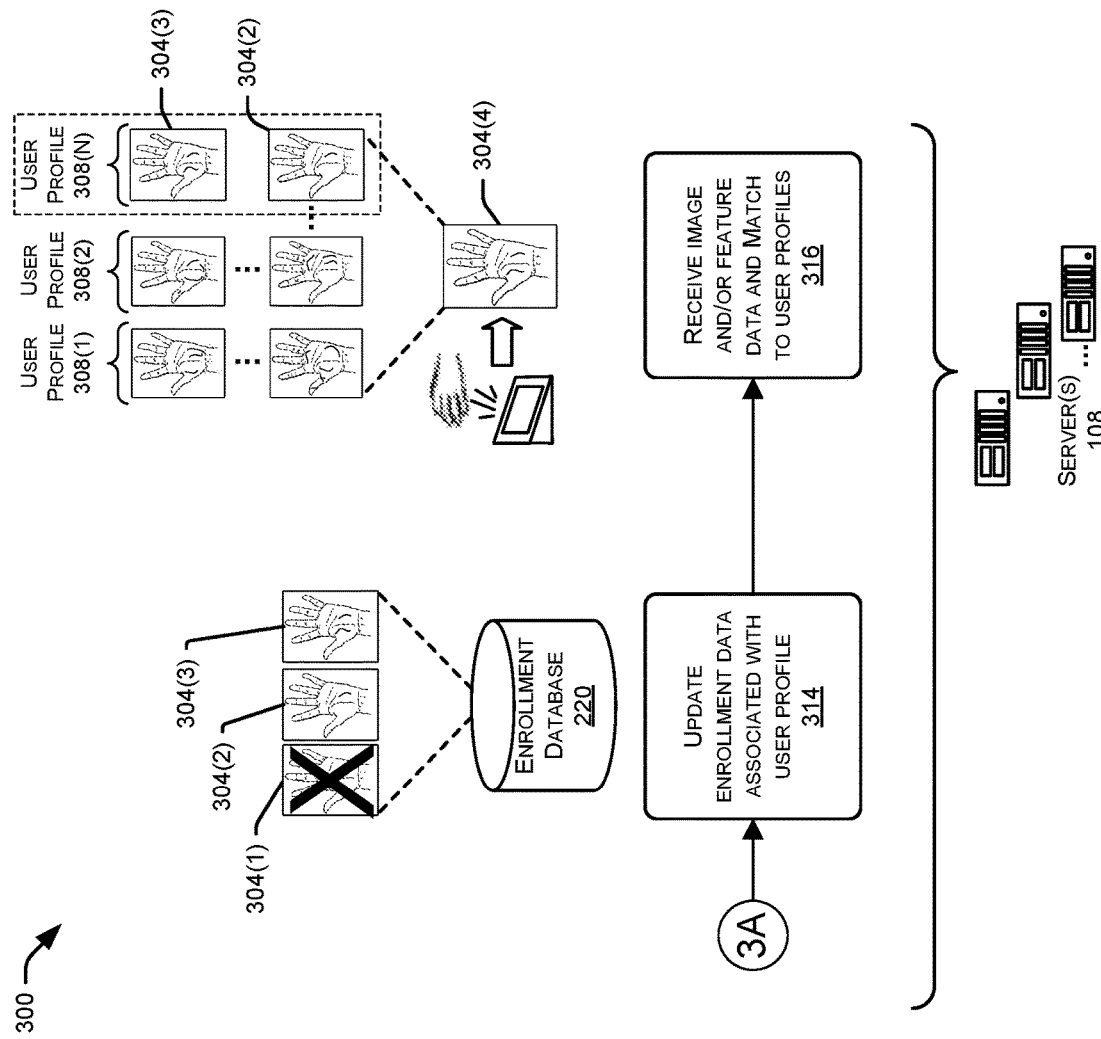

FIGS. 3A-3B collectively illustrate an example process 300 for enrolling a user in the user-recognition system of FIG. 1, as well as identifying the user thereafter and updating the enrollment of the user over time. As illustrated, in some instances the process 300 may be performed in whole or in part by one or more components accessible by the servers 108. At 302, the servers 108 store image data and/or feature data generated based on the image data in an enrollment database for enrolling the user with the user-recognition system. For example, the servers may receive, from the user-recognition device 104 or another device, image data 304(1) of a palm or other portion of the user and may generate featured data (e.g., in the form of a feature vector) using the image data. The servers 108 may thereafter store the image data 304(1) and/or the feature data in the enrollment database 220. It is to be appreciated that while the illustrations depict the storing (and in some instances comparing) of image data rather than feature data, this is for ease of illustration and in other instances feature vectors or other forms of feature data may additionally or alternatively be stored and/or compared.

At 306, the servers may receive additional image data 304(2) and/or corresponding feature data at a later time and may attempt to identify a user by matching the additional feature data to feature data stored in the enrollment database 220. For example, FIG. 3A illustrates that the image data 304(2) (and/or the corresponding feature data) may be compared to image data and/or feature data associated with a first user profile 308(1), to image data and/or feature data associated with a second user profile 308(2), to image data and/or feature data associated with a "N$^{th}$" user profile 308(N), and so forth. In this example, the servers 108 determine, based on the comparison, that the image data 304(2) corresponds to the user profile 308(N) and, thus, to the corresponding user.

In addition to identifying the user, however, the image data 304(2) may be used to update the enrollment data associated with the user profile 308(N) in some instances. For instance, the servers 108 may determine that a predefined amount of time has elapsed since the storing of the most recent enrollment data for the user or may determine that any other predefined event has occurred that results in the updating of the enrollment data. Thus, at 310, the servers 108 update the enrollment data associated with the user profile 308(N). For instance, the feature data associated with the image data 304(2) may be stored in the enrollment database 220, either separately or as part of an amalgamation of feature data. That is, while FIG. 3A illustrates storing the image data 304(2) alongside the image data 304(1) for the user profile 308(N), in some instances the feature data for these two images (and potentially others) may be averaged or otherwise combined to generate a single feature vector or other type of feature data.

In some instances, the image data 304(2) may be used to update the enrollment data associated with the user profile 308(N) based at least in part on a confidence level indicating whether or not the image data 304(2) corresponds to the user profile 308(N) being greater than a threshold confidence level. This confidence level may be greater than a confidence level used to simply recognize the user. That is, while a first confidence level may be used for recognition of a user entering and/or exiting a facility, a second, greater confidence level may be used to determine whether to update the enrollment data associated with a user profile. In some instances, the audit component 242 may determine whether the confidence level representing a confidence that that the image data 304(2) corresponds to the user profile 308(N) is greater than the relatively high confidence level and, if so, may cause the enrollment-update component 238 to update the enrollment data associated with the user profile 308(N) using the image data 304(2). It is further to be appreciated that in order to determine this confidence level, the audit component 242 may compare the image data 304(2) (or features thereof) to enrollment data associated with respective user profiles, as well as previous recognition attempts associated with the respective user profiles, regardless of whether or not the image and/or feature data associated with these previous recognition attempts were stored as enrollment data. By determining the confidence level based on comparison of both the enrollment data and the previous-recognition-attempt data, the audit component 242 is able to build up a relatively robust and rich confidence level to be used to determine whether the enrollment data associated with the user profile should be updated. Based on the above, it is noted that in some instances the system may compare image and/or feature data captured at a user-recognition device to the stored enrollment data when determining the identity of the user entering or exiting the facility, but the audit component 242 may later compare this image and/or feature data to both enrollment data and data associated with previous recognition attempts. In some instances, the use of enrollment data alone enables a faster determination of an identity of a user that is entering and/or exiting a facility, while the richer determination made by the audit component 242 may be performed at a later time.

At 312, after updating the enrollment database 220, the servers may receive yet more image data 304(3) and may again attempt to determine the user profile associated with the image data 304(3). For instance, a user may again have visited a facility, such as the facility 102, and may have requested to be identified by providing an image of the palm of the user. Upon receiving the image data 304(3), the servers may generate corresponding feature data and may compare this feature data to the feature data associated with the example user profiles 308(1)-(N). Again, in this example the servers determine that the image data 304(3) corresponds to the user profile 308(N).

FIG. 3B continues the illustration of the process 300. At 314, the servers again determine (e.g., in response to identifying a predefined event) to update the enrollment database 220. In this example, however, in addition to adding information corresponding to the most-recently received image data 304(3), the servers remove (or lessen) the information corresponding to the least-recent image data 304(1). For instance, the servers 108 may remove feature data and/or image data that is older than a predefined amount of time, such as six months, one year, two years, etc. As such, the servers may utilize a sliding window for updating the enrollment database 220 such that the image data and/or feature data used to identify users is not older than the predefined amount of time, such as six months or the like. In addition, or in the alternative, the servers 108 may utilize a decay function such that feature data is weighted differently during the comparison process, with more recent feature data used more heavily than less recent feature data. In still other instances, the image data 304(1) may be removed (or lessened) based on the quality of this image data 304(1) relative to the additional feature data 304(2) and 304(3). For example, if the newer image data 304(2) and/or 304(3) are of higher quality than the image data 304(1), the image data 304(1) may be removed or otherwise lessened.

At 316, the servers 108 again receive additional image data 304(4), potentially in response to the user again entering the facility 102 and providing an image of his or her palm. In response, the servers attempt to match the image and/or feature data to the image and/or feature data associated with the user profiles. In this instance, however, when making the comparison with the image and/or feature data associated with the user profile 308(N), the servers no longer compare the image data 304(4) and/or corresponding feature data to the image data 304(1) and/or its corresponding feature data, given that the latter information has been removed from the enrollment database 220. Instead, in this example the servers 108 compare the image data 304(4) to the more recent image data 304(2) and 304(3) and/or their corresponding feature data.

Figure 4:
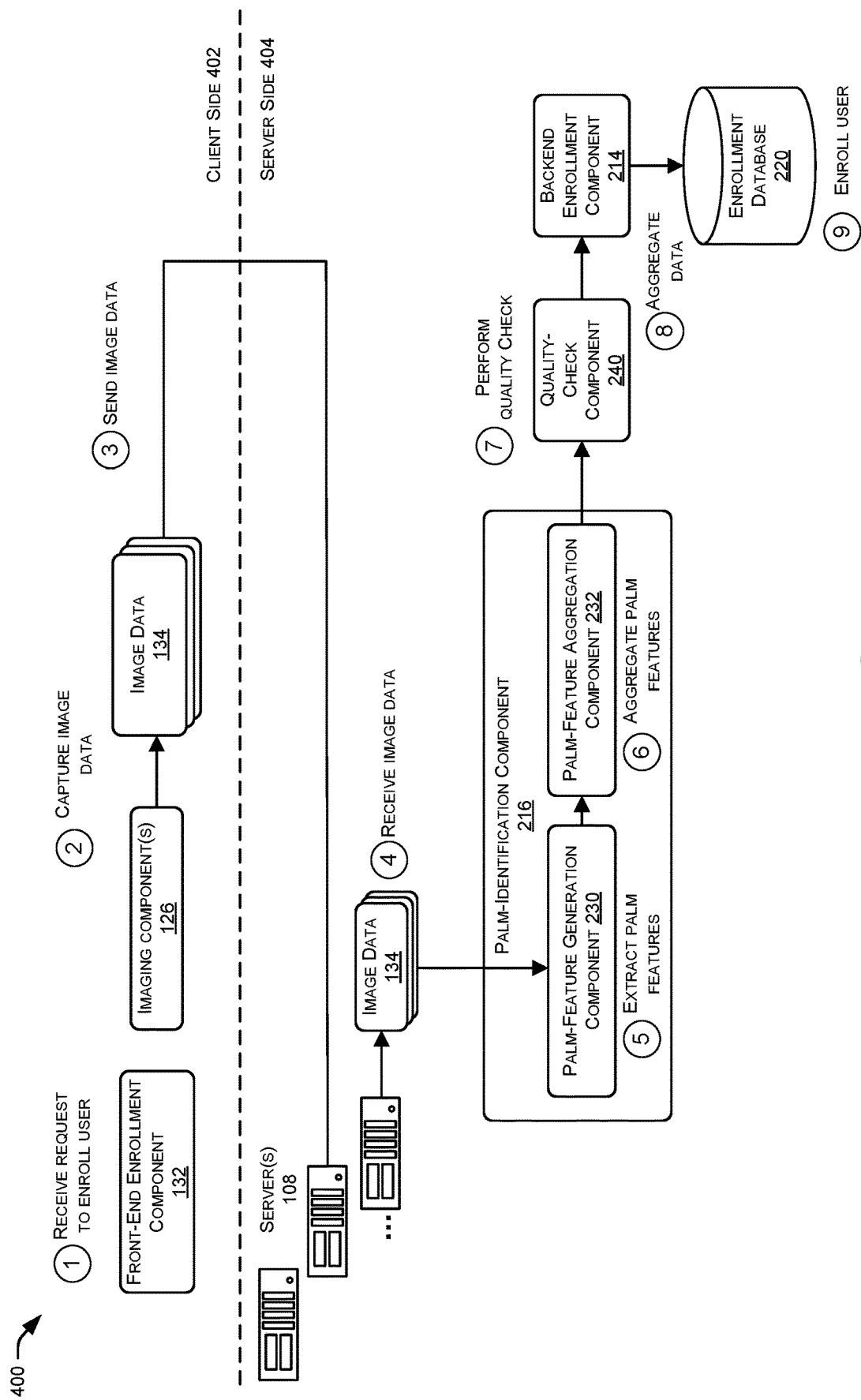
FIG. 4 illustrates an example environment including a block diagram of one or more servers configured to support at least a portion of the functionality of a user-recognition system, as well as an example flow of data within the system for enrolling a user with the user-recognition system.

FIG. 4 illustrates an example environment 400 including block diagram of one or more servers 108 configured to support at least a portion of the functionality of a user-recognition system, as well as an example flow of data within the system for enrolling a user 106 for use of the user-recognition system.

As illustrated, the environment 400 includes a client side 402 and a server side 404. However, this is merely illustrative, and some or all of the techniques may be performed entirely on the client side 402, or entirely on the server side 404. At "1," a front-end enrollment component 132 may receive a request to enroll a user 106 for use of the user-recognition system. For example, the request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

Upon receiving the request to enroll, the front-end enrollment component 132 may activate or otherwise utilize the imaging component(s) 126 to generate image data 134 representing a palm of the user 106. At "2," the user-recognition device 104 then captures image data 134 and, at "3", sends the image data 134 to the server(s) 108. For instance, the user-recognition device 104 may encode and send the audio data 142 and image data 134 over the network(s) 138 to the server(s) 108. Further, in some instances some of the images may be removed if there are not in focus, do not have a threshold level of discriminability of the characteristics of the palm of the user, or the like. This removal may occur on the client side 402 and/or the server side 404.

At "4," the servers receive the image data and, at "5", the palm-feature generation component 230 may extract palm-feature data 218 from the image data 134. In some examples, prior to extracting the palm-feature data 218, the palm-feature generation component 230 may perform various operations for processing the image data 134 prior to extracting the palm-feature data 218. For instance, the palm-feature generation component 230 may initially perform user detection to determine that the image data 134 represents a palm of a user 106. For instance, the palm-feature generation component 230 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting at least a portion of the user 106 and represented by the image data 134. Further, the palm-feature generation component 230 may perform hand-pose estimation in order to align the palm of the user 106 with a common coordinate system. After aligning the image of the hand into a common coordinate section, the portion of the image data corresponding to the palm may be identified and cropped. This remaining portion of the image data may thereafter be used to extract features therefrom by, for example, running a neural network on the cropped section of the image data. In some examples, hand-pose estimation may improve the extraction of features representing the palm of the user 106. Once the hand of the user 106 has been aligned, the palm-feature generation component 230 may extract features (e.g., palm-feature data 218) from the image data 134. In some examples, the trained model(s) 228 may utilize a triples loss function which converts image data 134 into a feature embedding in a metric space (e.g., palm-feature data 218), which may allow for comparisons with subsequent feature vectors using, for example, squared distance calculation.

At "6," the palm-feature aggregation component 232 may aggregate feature data (e.g., palm-feature data 218) from various image data 134. For instance, the image data 134 may represent the hand of the user 106 at different angles, under different lighting conditions, or other differing characteristics. The palm-feature aggregation component 232 may aggregate the palm-feature data 218 together, such as by averaging out feature vectors.

At "7," the quality-check component 240 may perform a quality check on the palm-feature data. For example, the quality-check component 240 may utilize a trained model(s) 228 to determine an overall metric of the quality of the extracted palm-feature data 218. If the overall metric is poor, or below a threshold quality level, the user-recognition system may request to acquire additional image data 134. In addition, or in the alternative, the quality-check component 240 may perform a de-duping process to ensure that the user associated with the palm-feature data hasn't already enrolled in the system. If the overall quality metric is good or acceptable, and if the de-duping process does not reveal that the user has previously enrolled in the system, the backend enrollment component 214 may aggregate the data at "8."

For example, at "8" the backend-enrollment component 214 may aggregate the palm-feature data 218 and enroll the user at "9" in the enrollment database 220. The backend-enrollment component 214 may store associations (e.g., mappings) between the palm-feature data 218 with a user profile 222 of the user 106 requesting to be enrolled for use of the user-recognition system.

Figure 5:
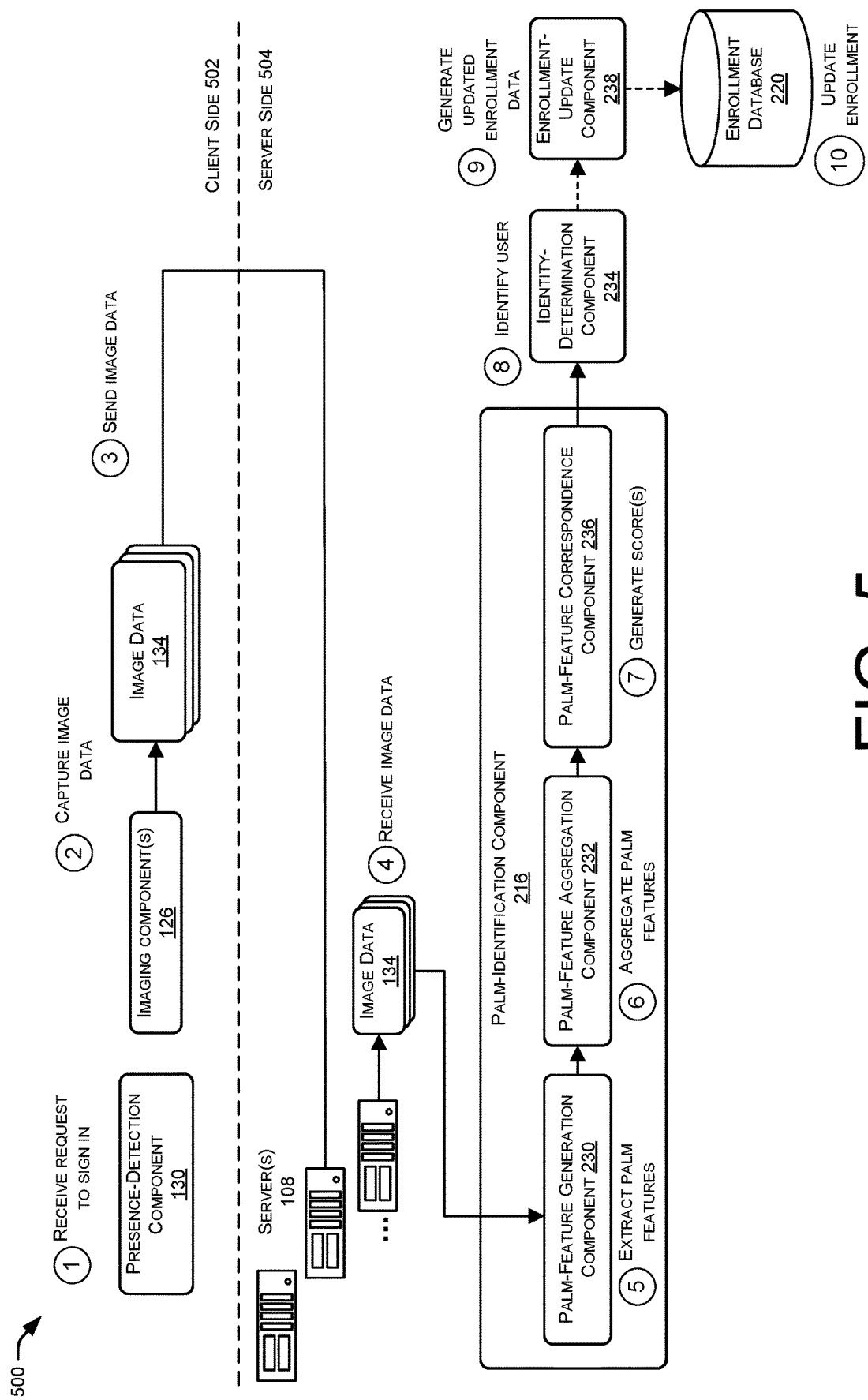
FIG. 5 illustrates an example environment including a block diagram of one or more servers configured to support at least a portion of the functionality of a user-recognition system, as well as an example flow of data within the system for identifying a user of the user-recognition system and, potentially, updating the enrollment of the user.

FIG. 5 illustrates an example environment 500 including a block diagram of one or more servers 108 configured to support at least a portion of the functionality of a user-recognition system, as well as an example flow of data within the system for identifying a user 106 of the user-recognition system and, potentially, updating the enrollment of the user. As illustrated, the environment 500 includes a client side 502 and a server side 504. However, this is merely illustrative, and some or all of the techniques may be performed entirely on the client side 502, or entirely on the server side 504.

At "1," a user requests to sign in with the user-recognition system. For example, the presence-detection component 130 may be executable by the processor(s) 120 to detect a trigger indicating presence of the user 106. The trigger detected by the presence-detection component 130 may comprise one or more types of input. For instance, the presence-detection component 130 may include logic to detect, using one or more imaging components 126, a portion of a user 106 (e.g., a hand over the imaging component(s) 126 of the user-recognition device 104). Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130.

Upon identifying the request to sign in from the user, at "2" one or more imaging components 126 may generate image data 134 representing a palm of the user 106 and/or another portion of the user. At "3," the user-recognition device 104 may send the image data 134 to the server(s) 108. For instance, the user-recognition device 104 may encode and send the image data 134 over the network(s) 138 to the server(s) 108. Again, some of the image data 134 may be discarded based on the image data being out of focus, having a discriminability that is less than the threshold, and/or the like.

At "4," the servers may receive the image data 134 and, at "5", the palm-feature generation component 230 may extract palm-feature data 218 from the image data 134. In some examples, prior to extracting the palm-feature data 218, the palm-feature generation component 230 may perform various operations for processing the image data 134 prior to extracting the palm-feature data 218. For instance, the palm-feature generation component 230 may initially perform palm detection to determine that the image data 134 represents a hand of a user 106. For instance, the palm-feature generation component 230 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting the user 106 and represented by the image data 134. Further, the palm-feature generation component 230 may perform hand pose estimation to align the face of the user 106 with a common coordinate system. In some examples, hand pose estimation may improve the extraction of features representing the hand of the user 106. Once the hand of the user 106 has been aligned, the palm-feature generation component 230 may extract features (e.g., palm-feature data 218) from the image data 134. In some examples, the trained model(s) 228 may utilize a triples loss function which converts the image data 134 into a feature embedding in a metric space (e.g., palm-feature data 218), which may allow for comparisons with subsequent feature vectors using, for example, squared distance calculation.

At "6," the palm-feature aggregation component 232 may aggregate feature data (e.g., palm-feature data 218) from various image data 134. For instance, the image data 134 may represent the hand of the user 106 at different angles, under different lighting conditions, or other differing characteristics. The palm-feature aggregation component 232 may aggregate the palm-feature data 218 together, such as by averaging out feature vectors.

At "7," the palm-feature correspondence component 236 may generate one or more scores indicating a similarity between the aggregated features associated with the image data 134 and respective feature data stored in association with respective user profiles. In some examples, these correspondence scores may be determined, at least in part, on "distances" between the feature vector associated with the image data and respective feature vectors of the respective palm-feature data 218 stored in association with user profiles in the enrollment database 220.

At "8," the identity-determination component 234 may determine the identity of the user based on the correspondence scores. For example, the identity-determination component 234 may identity the user profile associated with the feature vector having the closest distance to the feature vector associated with the image data 134 and may deem the associated user the user associated with the image data 134.

At "9", in some instances the enrollment-update component 238 may use the recently received palm-feature data associated with the image data to update the enrollment of the identified user. For example, the enrollment-update component 238 may detect occurrence of a predefined event that results in the updating of the enrollment data. This may include a predefined amount of time having elapsed since the most-recent or least-recent feature data being associated with the profile, based on a characteristic of the transaction occurring at the facility in association with the image data 134 (e.g., a cost or number of items), based on a threshold amount of change between the current feature data and previous feature data associated with the user profile, based on an explicit request from the user associated with the user profiled, and/or the like. In some instances, the predefined event may comprise the audit component 242 determining that the received palm-feature data corresponds to the identified user with a confidence level that is greater than the previously discussed high threshold confidence level. That is, while the recognition process described with reference to steps "7"-"8" may be performed with reference to enrollment data, the audit component may determine a confidence level using both the enrollment data and image and/or feature data associate with previous recognition attempts. If the audit component 242 thereafter computes a confidence level that is greater than the relatively high confidence level, then the enrollment-update component 238 may determine to update the enrollment data of the identified user.

At "10", the enrollment-update component 238 updates the enrollment data associated with the corresponding user profile in the enrollment database 220. As described above, this may include storing the feature data and/or image data alongside existing feature data and/or image data associated with the profile, averaging the existing feature data with the new feature data, and/or the like.

Figure 6:
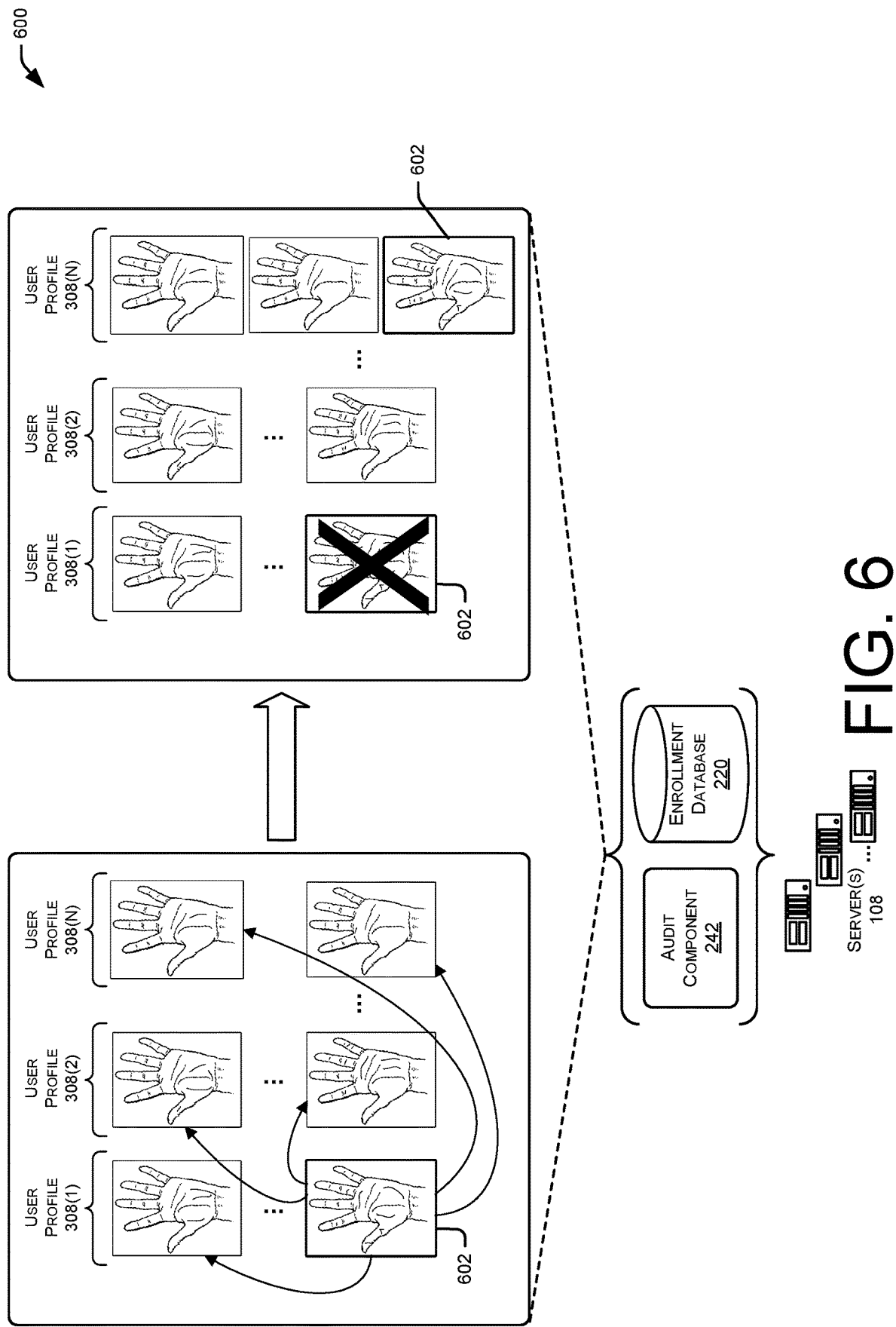
FIG. 6 illustrates an example scenario where the user-recognition system performs an audit of the system by comparing image data, or feature data generated therefrom, to other image and/or feature data to identify any potential mismatches in the system.

FIG. 6 illustrates an example scenario 600 where the user-recognition system performs an audit of the system by comparing image data, or feature data generated therefrom, to other image and/or feature data to identify and potential mismatches in the system. As described above, in some instances the user-recognition system may perform a first level of analysis in real-time or near-real-time when image data is received from a user-recognition device 104 in the facility 102. However, the user-recognition system may later perform a second level of analysis at a later time when more time may be taken to perform the analysis. Thus, the system may periodically perform in-depth auditing of the system to identify and correct any potential errors made in real-time or near-real-time, as well as to train the trained model(s) 222 based on these errors and corrections. Additionally, or alternatively, the auditing processes may be performed in response to any other predefined event, such as user feedback (e.g., a user objecting to a match or a transaction), a match having a relatively low confidence (e.g., because the score was relatively low and/or a score for a different profile was very close), or the like. Furthermore, it is to be appreciated that in some instances the audit component may store, in association with a particular user profile, an indication that the corresponding user is to be undergo a higher level of recognition based on, for example, having been misrecognized, having a consistently low confidence value during recognition, or the like.

In the illustrated scenario 600, the left side of the illustration depicts that the first user profile 308(1) is associated with a first set of images (or corresponding feature data), the second user profile 308(2) is associated with a second set of images (or corresponding feature data), and so forth. For example, upon a user providing the image data 602, the palm-identification component 216 has determined that this image data 602 corresponds to the first user profile 308(1).

Sometime after this determination has been made, however, the audit component 242 may trigger an auditing process to identify any potential errors. This may involve cross-matching each image data or corresponding feature data to: (1) respective image data or feature data associated with the same profile, and (2) respective image data or feature data associated with different user profiles. As illustrated, for example, the audit component 242 may trigger a comparison between the image data 602 (or its feature data) with image data (or corresponding feature data) associated with the user profile 308(1), as well as image data (or corresponding feature data) associated with the second user profile 308(2), user profile 308(N), and so forth. It is to be appreciated, however, that the image data associated with each respective user profile may, in some instances, correspond both to enrollment data (e.g., image data and/or feature data used to identify a respective user entering a facility) and data corresponding to previous recognition attempts. That is, the latter data may comprise image and/or feature data from a respective user's previous recognition attempt(s), regardless of whether that data was stored as enrollment data for user in later recognition attempts.

As illustrated, in this example the palm-identification component 216 has identified a previous error made by the system. That is, the image data 602 has been determined to actually be associated with the user profile 308(N) rather than the user profile 308(1). As such, the audit component 242 has updated the enrollment database 220 to remove the association between the image data 602 and the user profile 308(1) and to add an association between the image data 602 and the user profile 308(N). Further, if any transactions were associated with the user profile 308(1) during a time at which the image data 602 was provided, the transaction may be disassociated from the user profile 308(1) and associated with the user profile 308(N). Further, if a payment instrument associated with the user profile 308(1) was charged for the transaction, the charge may be refunded. Additionally, a payment instrument associated with the user profile 308(N) may be charged for the transaction. Further, the training component 226 may use the error and subsequent correction for training the one or more trained models 228 to improve the accuracy of subsequent recognition using the models 228.

Figure 7:
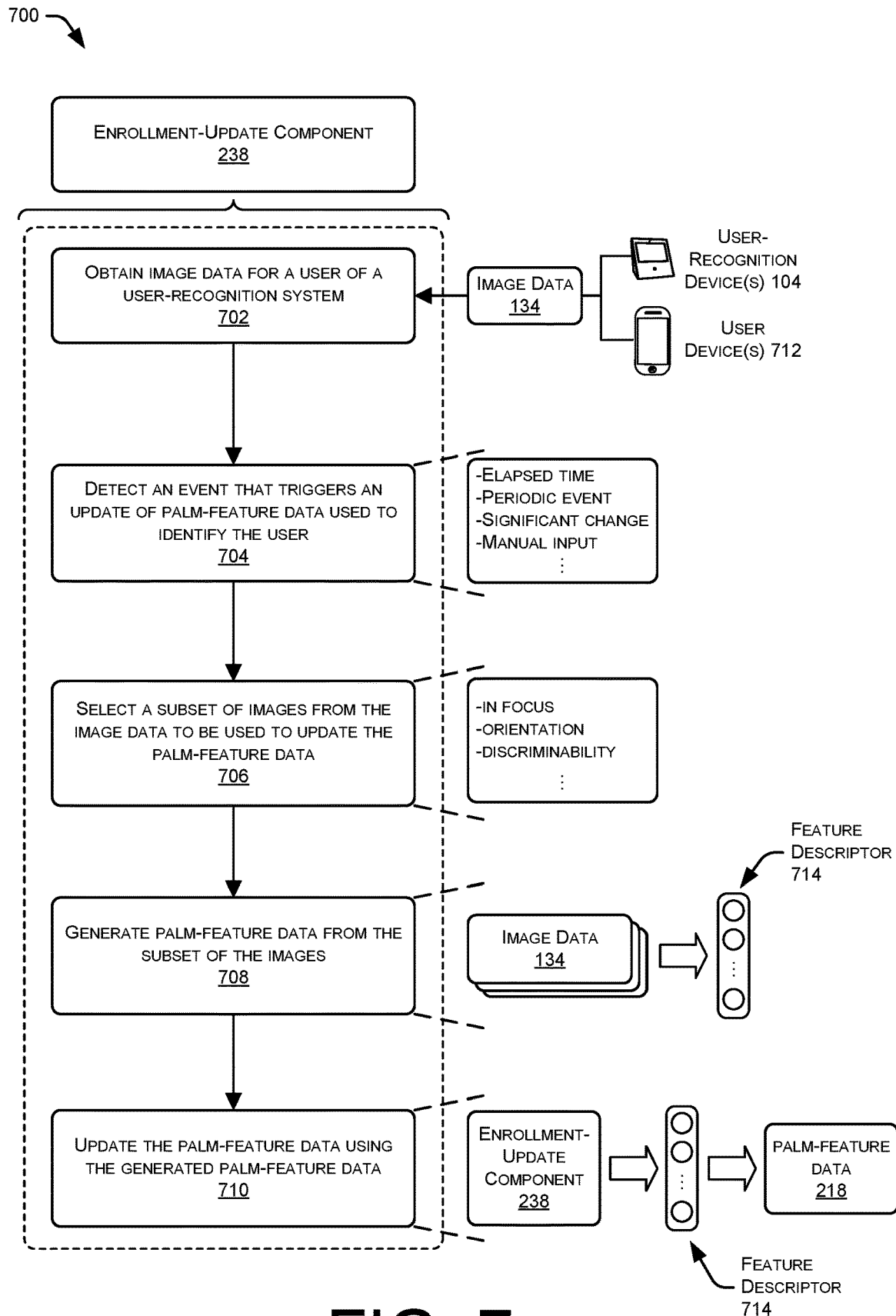
FIG. 7 illustrates a flow diagram of an example process for updating feature data for a user of a user-recognition system.

FIG. 7 illustrates a flow diagram of an example process 700 for updating stored palm-feature data 218 for a user profile 222 of a user-recognition system. In some examples, the process 700 may be performed at least partly by the enrollment-update component 238. In some examples, additional steps, or less steps, may be performed to update the palm-feature data 218.

At 702, the enrollment-update component 238 may obtain image data 134 for a user 106 of a user-recognition system. In some examples, the image data 134 may be obtained for each occurrence where an enrolled user 106 at least one of enters or exits a facility 102 using a user-recognition device 104. Additionally, or alternatively, the enrollment-update component 238 may obtain image data 134 from one or more use devices 712 (e.g., phone, tablet, laptop, etc.) associated with the user 106.

At 704, the enrollment-update component 238 may detect an event that triggers an update of palm-feature data 218 stored in an enrollment database 220 that is used to identify the user 106. The event may comprise any type of event that indicates that the enrollment-update component 238 is to update the stored palm-feature data 218 in the enrollment database 220. For example, the event may comprise an amount of time having elapsed since a least-recent or most-recent update of the user's enrollment data. The event may also comprise a periodic event where the enrollment-update component 238 updates the palm-feature data 218 according to a predefined schedule (e.g., every month, every six months, etc.). In some examples, the enrollment-update component 238 may detect an event when sufficient images have been obtained since a previous update of the palm-feature data 218. For example, once the enrollment-update component 238 has collected more than a threshold number of images and/or videos (e.g., 10 images, 100 images, etc.), the enrollment-update component 238 may determine to update the palm-feature data 218. In some examples, the enrollment-update component 238 may be configured to detect an event that triggers an update upon detecting a significant change in the palm-feature data 218 for the user 106 shown in new image data 134. For instance, the palm of the user 106 may have significantly changed due to, for example, the user 106 gaining callouses, wearing a bandage, or the like. The enrollment-update component 238 may determine, by analyzing the image data 134 and/or the palm-feature data 218 extracted from the image data 134, whether the palm features of the user 106 have changed by a significant amount. The threshold change may be set for any amount of change (e.g., 5% change, 10% change, etc.). In further examples, the enrollment-update component 238 may determine to update the palm-feature data 218 stored in the enrollment database 220 upon receiving manual input from an administrator of the user-recognition system, and/or the user 106, requesting the update. Further, the enrollment-update component 238 may determine that the user 106 was incorrectly recognized by the user-recognition system at least one time, or more than a threshold number of times, and determine to update the palm-feature data 218 stored in the enrollment database 220 based on the misidentification.

In some instances, the predefined event may comprise determining that the received palm-feature data corresponds to the identified user with a confidence level that is greater than the previously discussed high threshold confidence level. That is, while the recognition process may be performed with reference to enrollment data, the determination of whether to update enrollment data of a user may be done using both the enrollment data and image and/or feature data associate with previous recognition attempts. If the system computes, using this larger set of data, a confidence level that is greater than the relatively high confidence level, then the enrollment-update component 238 may determine to update the enrollment data of the identified user. In some instances, the system may determine to update the enrollment data based on determining that the higher threshold confidence level is met and occurrence of one or more additional predefined events, such as an amount of time having elapsed since the last update, and/or the like. While the elapsing of a predefined amount of time since the updating of a user's enrollment data is described as a potential trigger to update the enrollment data, it is noted that in some instances the elapsing of another predefined amount of time since a user having been recognized by the user-recognition system may comprise a trigger to remove a user profile. For example, if a user has not visited a facility or has not otherwise been identified via the user-recognition for six months, one year, five years, or the like, the user profile and/or enrollment data associated with that user may be removed from the system in some instances.

At 706, the enrollment-update component 238 may select a subset of images from the obtained image data 134 to be used to update the palm-feature data 218. In some examples, the enrollment-update component 238 may select the subset of images from the image data 134 based on a respective quality of the images, such as whether each image was in-focus, whether the image has a high discriminability (that is, does well to illustrate creases, veins, etc.), whether the hand is oriented correctly (e.g., in a substantially parallel plane to the imaging components 126), or the like.

At 708, the enrollment-update component 238 may extract feature data (e.g., palm-feature data 218) from the subset of the images. For instance, the enrollment-update component 238 may call the palm-feature generation component 230 to extract, or embed, palm-feature data 218 from the image data 134 for the subset of the images. The palm-feature generation component 230 may extract the palm-feature data 218 from the image data 134 into any format, such as a feature descriptor 716 (e.g., a 128-dimension vector), a feature matrix, and/or any other representation.

At 710, the enrollment-update component 238 may update the palm-feature generation component 230 stored in the enrollment database 220 using the feature data (e.g., palm-feature data 218) extracted from the subset of the images included in the image data 134. For example, the enrollment-update component 238 may average the extracted palm-feature data 218 with the palm-feature data 218 stored in the enrollment database 220. In some examples, the enrollment-update component 238 may replace the palm-feature data 218 stored in the enrollment database 220 with the extracted palm-feature data 218. In some examples, the enrollment-updated component 256 may store the extracted palm-feature data 218 in the enrollment database 220 along with the previously stored palm-feature data 218, thereby storing at least two feature vectors, or representations.

Figure 8A:
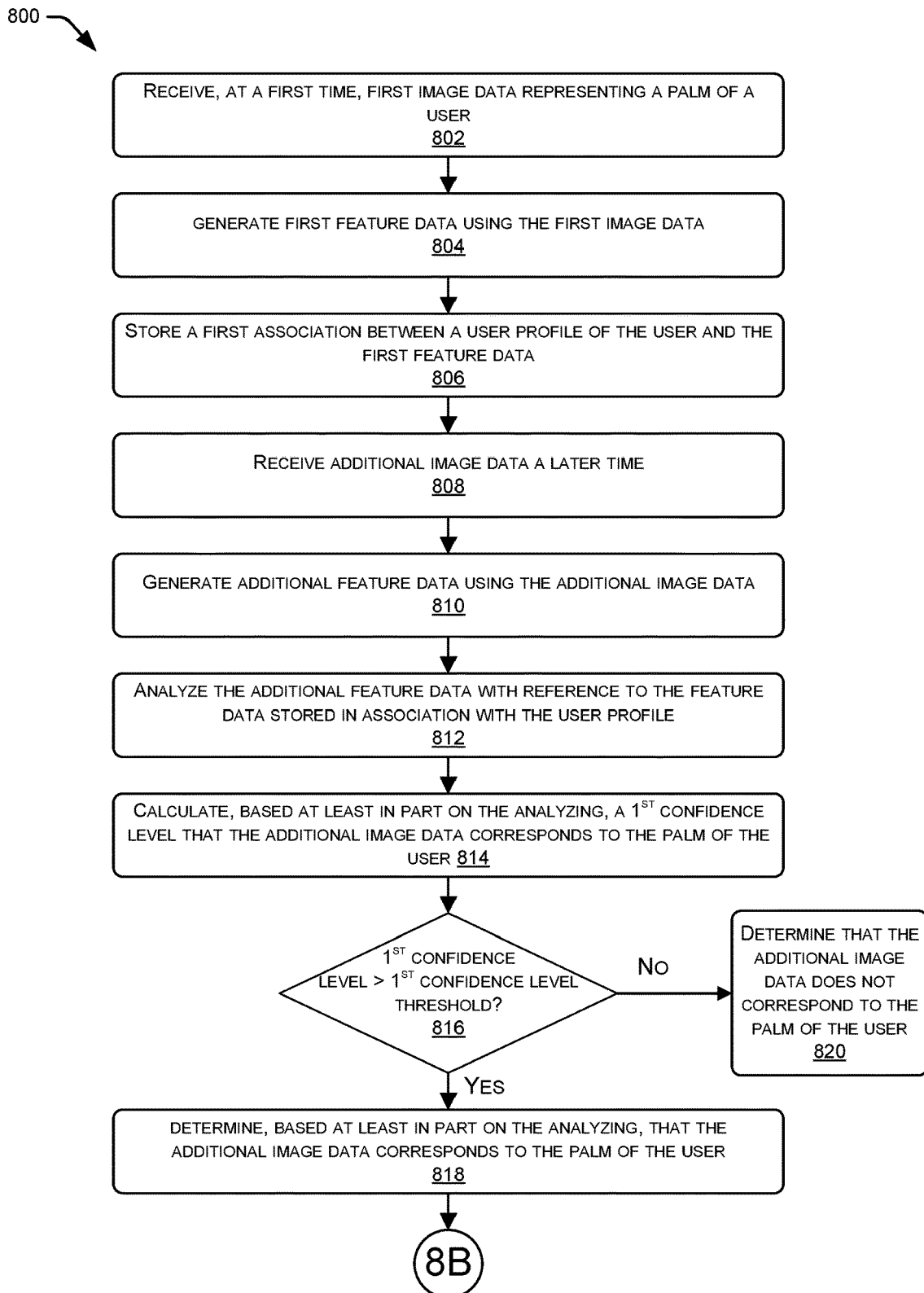
FIGS. 8A-8C collectively illustrate a flow diagram of an example process for enrolling a user with a user-recognition system and updating this enrollment over time.
Figure 8B:
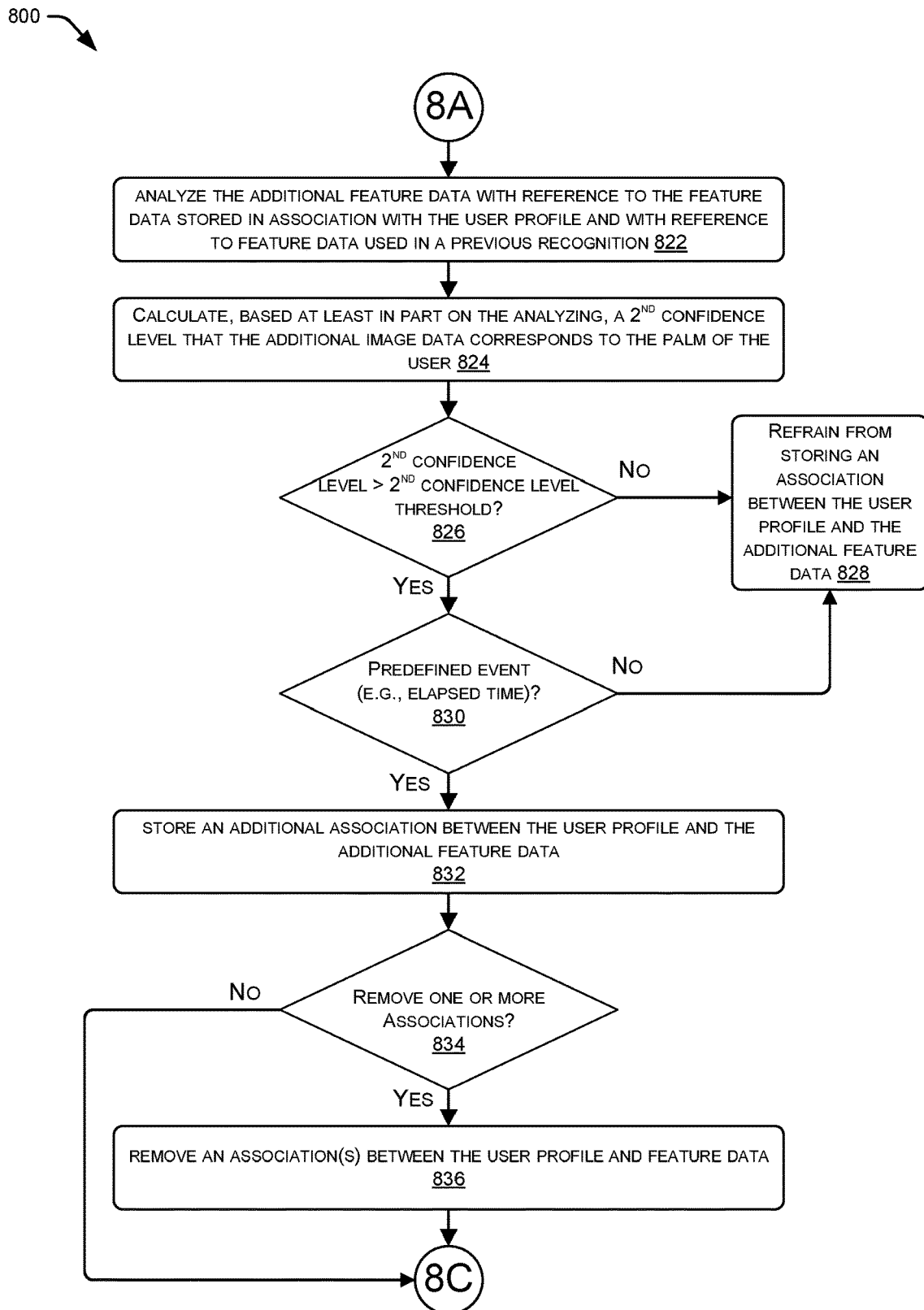
Figure 8C:
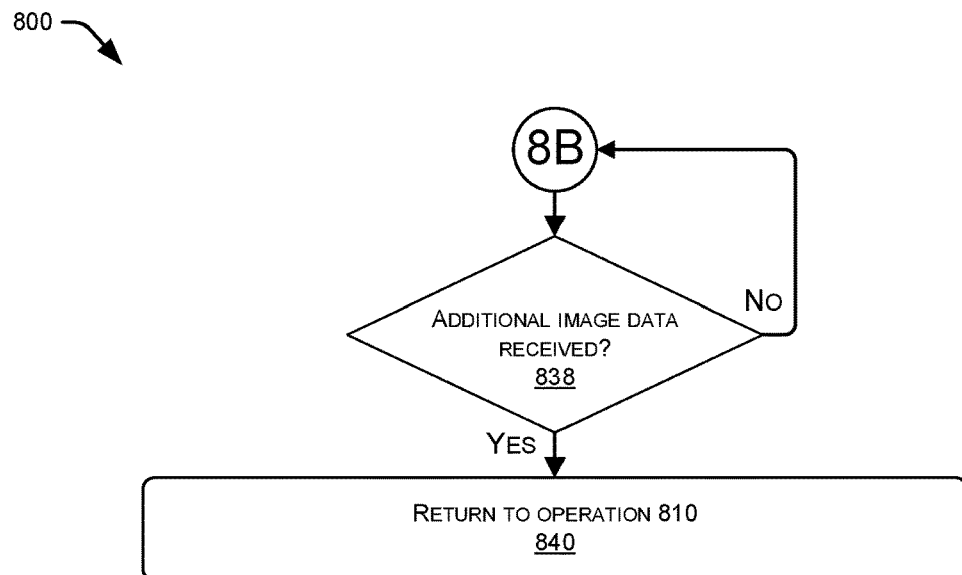

FIGS. 8A-8C collectively illustrate a flow diagram of an example process 800 for enrolling a user in a user-recognition system and updating this enrollment over time. The process 800, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by the servers 108, the user-recognition device 104, and/or a combination thereof.

The process 800 includes, at 802, receiving, at a first time, first image data representing a palm of a user. For example, the servers 108 may receive one or more images from a user-recognition device 104, as described above. At 804, the process 800 includes generating first feature data using the first image data and storing, at 806, a first association between a user profile of the user and the first feature data. The operations 802-806 may thus comprise a portion of an enrollment process for enrolling a user with a user-recognition service, as described above.

At 808, the process 800 includes receiving additional image data at a later time. For example, the servers 108 may receive the additional image data (or feature data generated therefrom) at a time after the user has enrolled in the user-recognition system. Further, the additional image data may be received from the same user-recognition device 104 or from a different device. At 810, the process includes generate additional feature data using the additional image date. As described above, this may include aligning an image of the hand of the user to a common coordinate system, cropping a portion of the image data corresponding to the palm of the user, and using a trained neural network on the cropped portion of the image data to generate the feature data. At 812, the process 800 may include analyzing the additional feature data with reference to the feature data stored in association with the user profile, such as the first feature data generated at 804. It is to be appreciated that while the process 800 describes analyzing the additional feature data with reference to the first feature data (and/or other feature data) stored in association with the user profile discussed with reference to operations 802-806, the process 800 may additionally compare this additional feature data to feature data stored in array of other user profiles for identifying the user associated with the additional feature data.

At 814, the process 800 includes calculating, based at least in part on the analyzing, a first confidence level that the additional image data corresponds to the palm of the user that is associated with the user profile. For example, the first confidence level may comprise a first correspond score calculated by the palm-feature correspondence component 236. At 816, the process 800 may compare the first confidence level to a first confidence level threshold and, if the first confidence level is greater than the first threshold, at 818 the process 800 may determine that the additional image data corresponds to the palm of the user and, thus, the user that is associated with the additional feature data may be deemed to be the user associated with the user profile. Thus, any transaction performed by the user, such as the acquiring of items at a facility, may be associated with this user profile. If, however, the first confidence level is not greater than the first threshold, then at 820 the process 800 determines that the additional image data does not correspond to the palm of the user.

FIG. 8B continues the illustration of the process 800 and includes, at 820, analyzing the additional feature data with reference to the first feature data and with reference to feature data used in a previous recognition of the user. That is, while the analyzing that occurs at 812 may comprise analyzing the additional feature data with reference to the enrollment data associated with a user profile, the analyzing at 822 may comprise analyzing the additional feature data with reference to the enrollment data and with reference to feature data associated with previous images of the corresponding user entering and/or exiting a facility. As such, the analyzing at 822 may comprise a richer, more robust analysis than the analyzing at 812. In some instances, the analysis performed at 812 comprises an analysis in real-time or near-real-time as a user is entering or exiting a facility, while the analysis at 822 is performed later at a time when more time to perform the analysis is available. At 824, the process 800 calculates, based on the richer analysis, a second confidence level that the additional image data corresponds to the palm of the user.

At 826, the process 800 determines whether the second confidence level is greater than a second confidence level threshold. In some instances, the second confidence level threshold is greater than the first confidence level threshold, given that the second threshold may be used for updating the enrollment data of the user profile (as described immediately below), while the first threshold may be used simply to recognize a user entering or exiting a facility. If the second confidence level is not greater than the second confidence level threshold, then at 828 the process 800 may refrain from storing an association between the user profile and the additional feature data. That is, while the user-recognition system may have identified the user with a first amount of confidence, the system might not necessarily identify the user with a second level of confidence required to actually update the enrollment data against which subsequently received image data will be analyzed against.

If, however, the second confidence level is greater than the second threshold, then at 830 the process determines whether a predefined event has occurred. For instance, the process 800 may determine whether a predefined amount of time has elapsed since last updating the enrollment data, whether a user has requested to update the enrollment data, or whether any other predefined event has occurred. If not, then the process 800 may continue to 828 to refrain from storing an association between the user profile and the additional feature data. If so, however, then at 832 the process 800 may store an additional association between the user profile and the additional feature data. It is to be appreciated, however, that while the process 800 describes updating the enrollment data based on the second confidence level being greater than the second confidence level threshold and the occurrence of one or more predefined events, in other instances the enrollment data may be updated based on either of these conditions.

At 834, the process 800 may determine whether one or more associations are to be removed from the user profile. For example, enrollment data may be removed based on the addition of new enrollment data, based on certain feature data being added to the user profile at a time that is more than a threshold amount of time prior to the current time, or the like. For example, the enrollment data may be based on feature data that has been acquired within a predefined amount of time, such as the preceding six months, such that feature data that is older than this amount of time may be removed. If the process 800 determines to remove one or more associations, then at 836 the process 800 may remove one or more associations between feature data and the user profile.

FIG. 8C concludes the illustration of the process 800 and includes, at 838, determining whether additional feature data has been received. If so, then at 840 the process may return to 810. If not, then process 800 may await receipt of additional image data.

Figure 9:
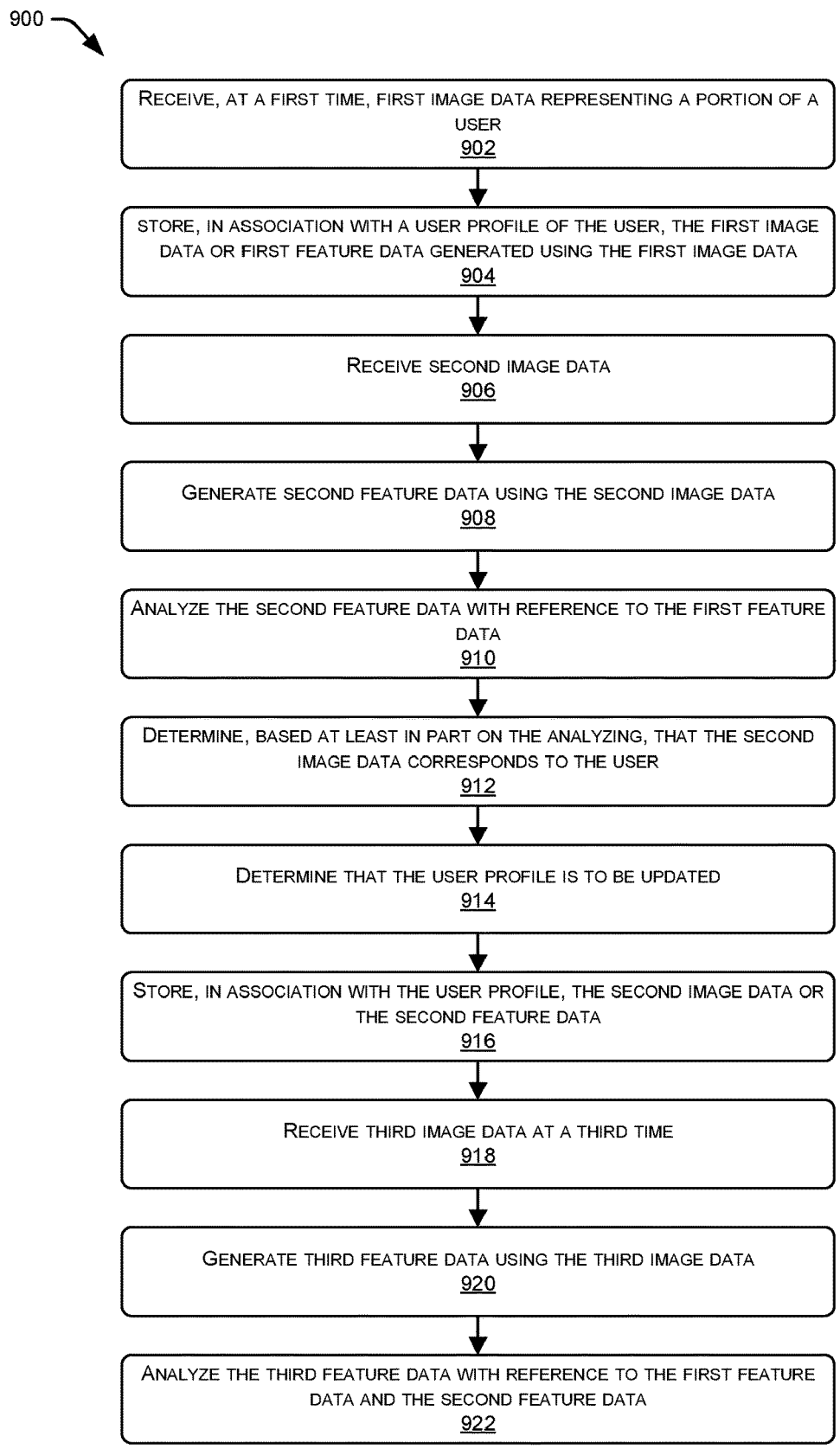
FIG. 9 illustrates another flow diagram of an example process for enrolling a user with a user-recognition system and updating this enrollment over time.

FIG. 9 illustrates another flow diagram of an example process 900 for enrolling a user in a user-recognition system and updating this enrollment over time. The process 900 includes, at 902, receiving, at a first time, first image data representing a portion of a user. The portion of the user may represent a palm of the user, a face of the user, a whole body of the user, or the like. At 904, the process may store the first image data or first feature data generated therefrom in association with a user profile of the user. At 906, the process 900 may receive second image data and, at 908, may generate second feature data using the second image data.

At 910, the process 900 may analyze the second feature data with reference to the feature data. This may include calculating a first confidence level and comparing the first confidence level to a first confidence level threshold to determine whether the second image data corresponds to the user profile. At 912, in this example the process 900 determines, based at least in part on the analyzing, that the second image data corresponds to the user. At 914, the process 900 determines that the user profile is to be updated. This may include, for example, calculating a second confidence level and determining that the second confidence level is greater than a second confidence level threshold. In some instances, the second threshold may be greater than the first threshold. Furthermore, the second confidence level may be calculated using enrollment data associated with the user profile and feature data associated with prior recognitions of the user of the user profile. In addition, or in the alternative, determining to update the profile may be based on the occurrence of a predefined event, such as an amount of time since a previous update having elapsed.

At 916, the process 900 stores, in association with the user profile, the second image data or second feature data generated therefrom. For example, the second image data and/or feature data may be stored in the user profile as enrollment data for future use in identifying the user associated with the user profile. At 918, the process 900 receives third image data a third time and, at 920, generates third feature data using the third image data. At 922, the process 900 may analyze the third feature data with reference to data that is based on both the first feature data and the second feature data. That is, the third feature data may be analyzed with reference to the enrollment data of the user profile, which may have been updated at 916 using the second feature data.

Figure 10:
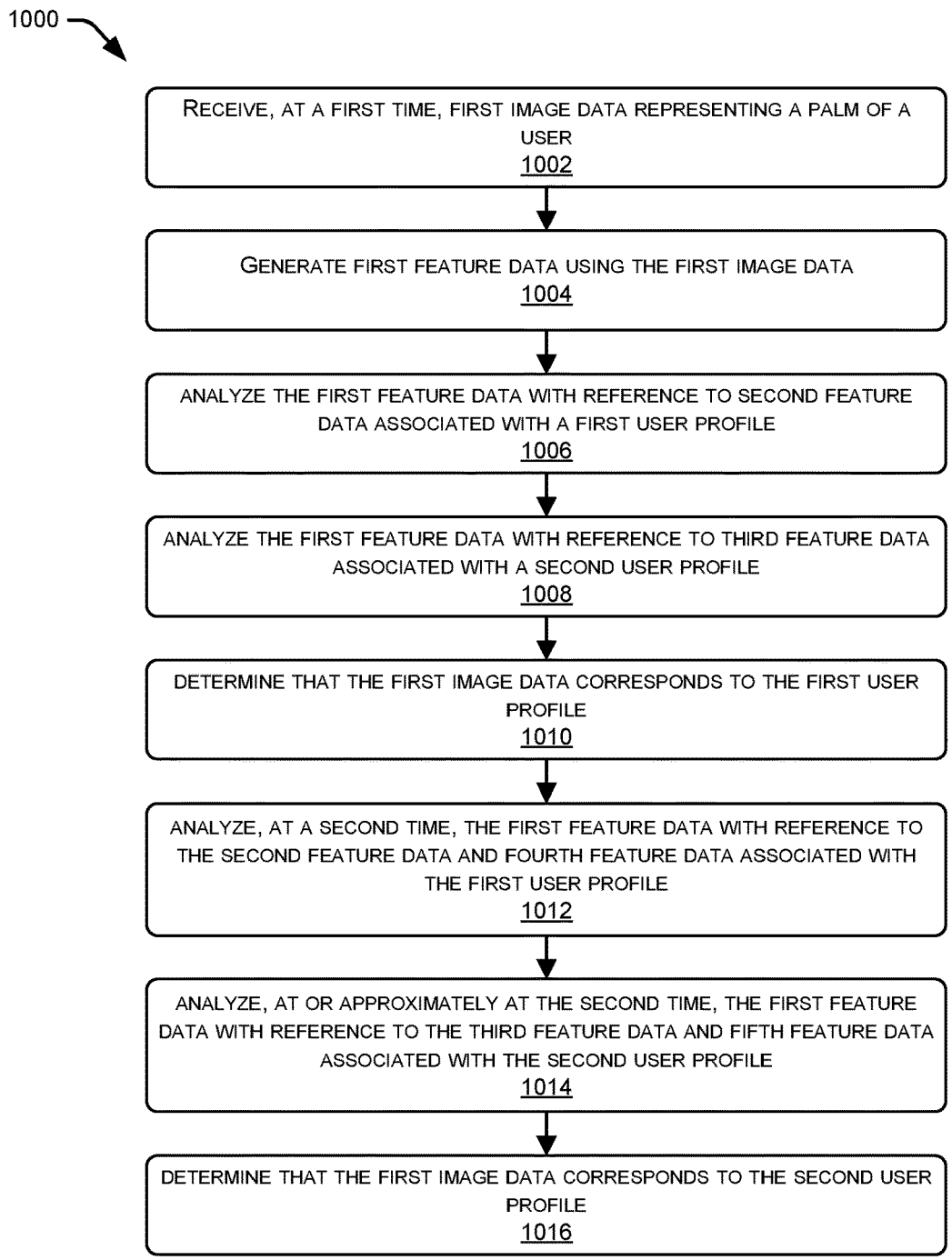
FIG. 10 illustrates a flow diagram of an example process for identifying and correcting errors in a user-recognition system.

FIG. 10 illustrates a flow diagram of an example process 1000 for identifying and correcting errors in a user-recognition system. The process 1000 includes, at 1002, receiving, at a first time, first image data representing a palm of a user. At 1004, the process 1000 includes generating first feature data using the first image data and, at 1006, analyzing the first feature data with reference to second feature data associated with a first user profile. At 1008, the process 1000 includes analyzing the first feature data with reference to third feature data associated with a second user profile. Based on both of the analyzing operations, at 1010 the process 100 may determine that the first image data corresponds to the first user profile.

At 1012, however, the process 1000 includes analyzing, at a second time, the first feature data with reference to the second feature data associated with the first user profile and with reference to fourth feature data associated with the first user profile, as well as analyzing, at 1014 and at or approximately at the second time, the first feature data with reference to the third feature data associated with the second user profile and with reference to fifth feature data associated with the second user profile. As described above, the analysis performed at 1012 and 1014 may be richer and more robust than the respective analyzing occurring at 1006 and 1008. In some instances, the latter analyzing may include additional analysis, such as analysis with reference to both enrollment data and data associated with prior recognition requests, while the latter analyzing may comprise analyzing the first feature data with reference to respective enrollment data associated with the respective user profiles.

At 1016, and based on the analyzing at 1012 and 1014, the process 1000 may determine that the first image corresponds to the second user profile, rather than the first user profile. As such, a transaction previously associated with the first user profile may be associated with the second user profile, while an indication of the transaction may be removed from the first user profile. Furthermore, one or more models used to make the determinations at 1010 and/or 1016 may be trained and/or retrained based on the conclusion at 1016.

Figure 11:
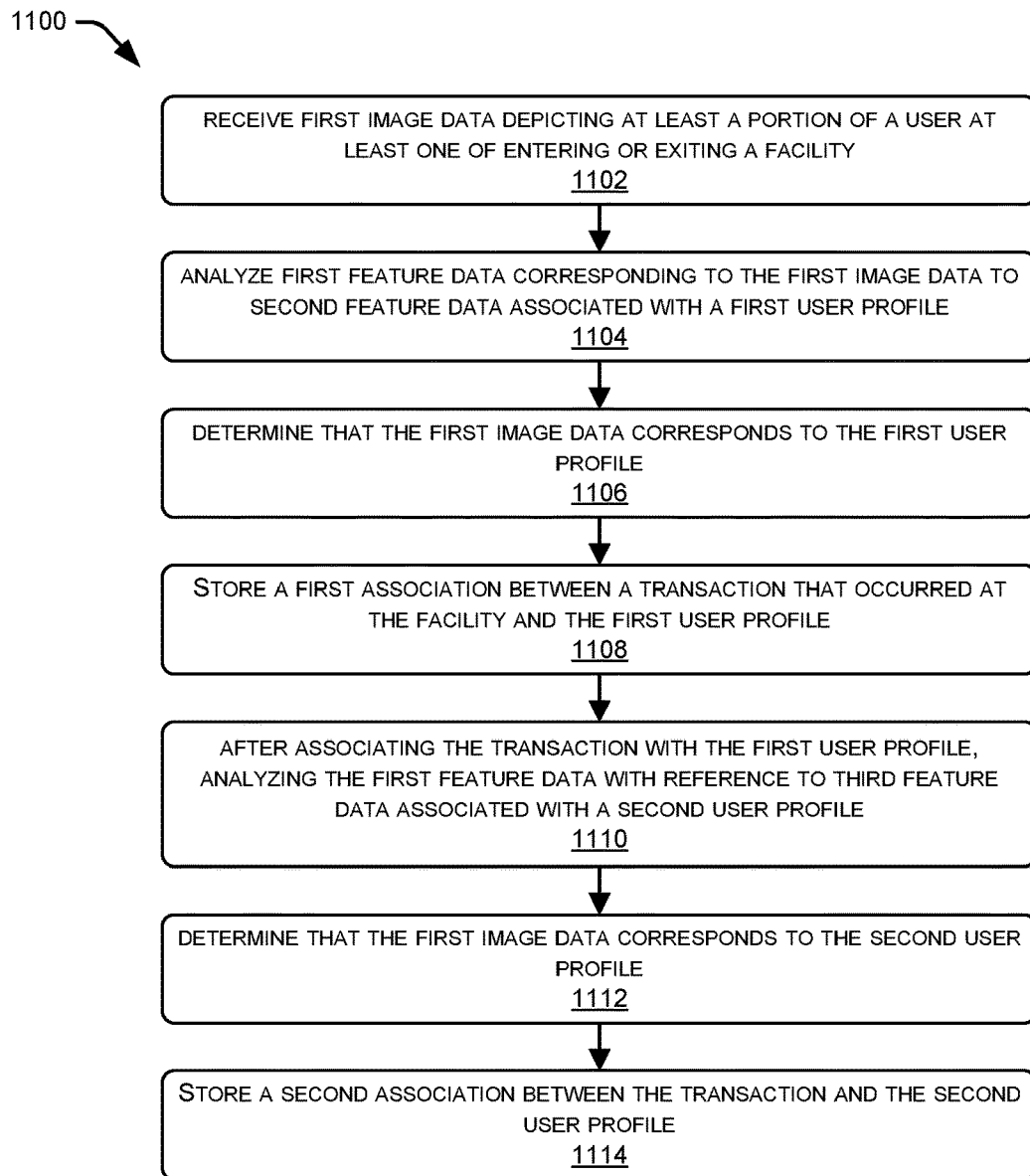
FIG. 11 illustrates a flow diagram of another example process for identifying and correcting errors in a user-recognition system.

FIG. 11 illustrates a flow diagram of another example process 1100 for identifying and correcting errors in a user-recognition system. The process 1100 includes, at 1102, receiving first image data depicting at least a portion of a user at least one of entering or exiting a facility. At 1104, the process 1100 includes analyzing the first feature data corresponding to the first image data with reference to second feature data associated with a first user profile. At 1106, the process 1100 determines, based at least in part on the analyzing, that the first image data corresponds to the first user profile.

At 1108, the process 1100 stores, based at least in part on the determining that the first image data corresponds to the first user profile, a first association between a transaction that occurred at the facility and the first user profile. At 1110, the process 1100 includes analyzing, at least partly after associating the transaction with the first user profile, the first feature data with reference to third feature data associated with a second user profile. At 1112, the process 1100 includes determining that the first image data corresponds to the second user profile. Thus, at 1114, the process 1100 includes storing, based at least in part on the determining that the first image data corresponds to the second user profile, a second association between the transaction and the second user profile. In addition, the association between the transaction and the first user profile may be removed.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 12:
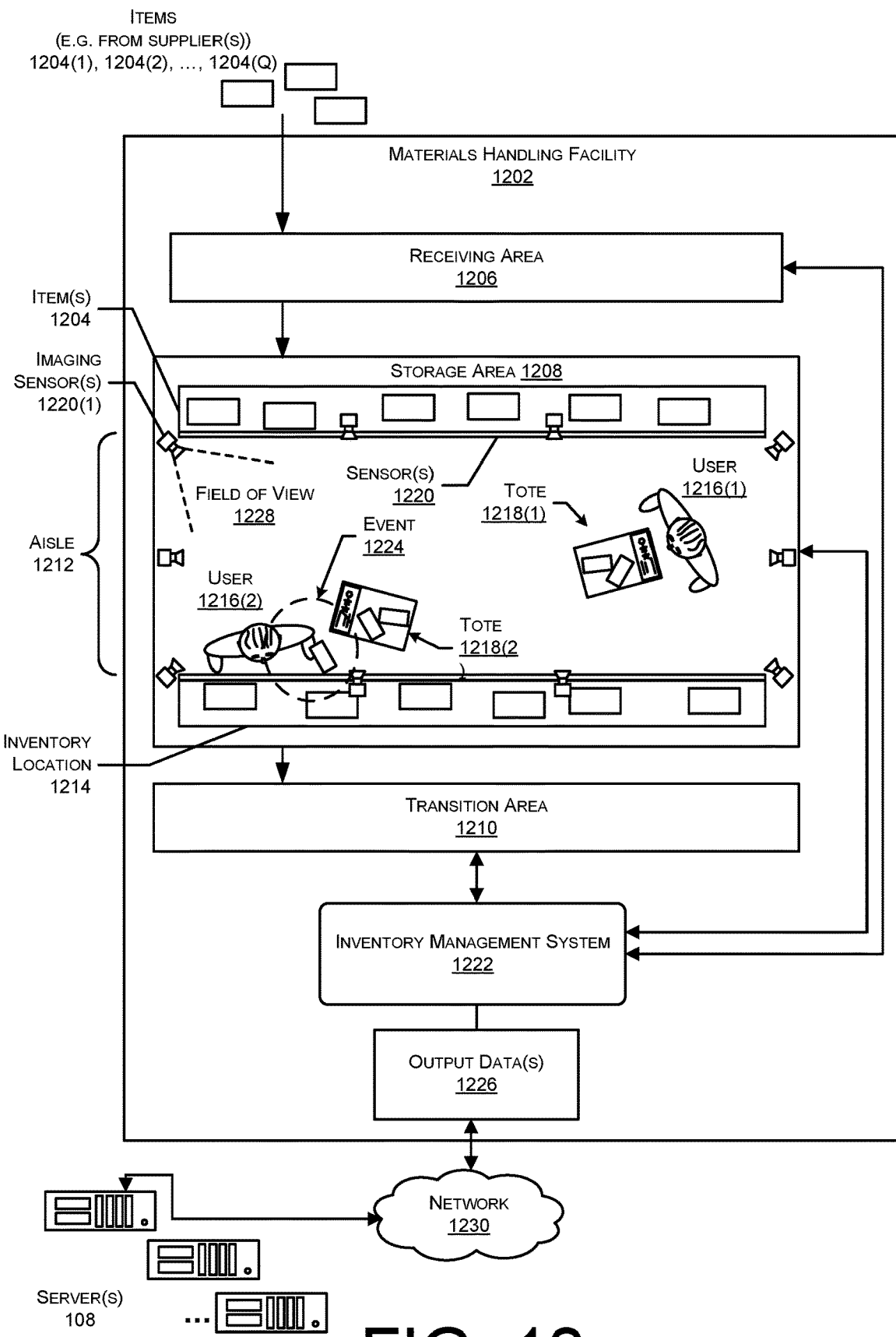
FIG. 12 is a block diagram of an example materials handling facility that includes sensors and an inventory management system configured to generate output regarding events occurring in the facility using the sensor data.
Figure 13:
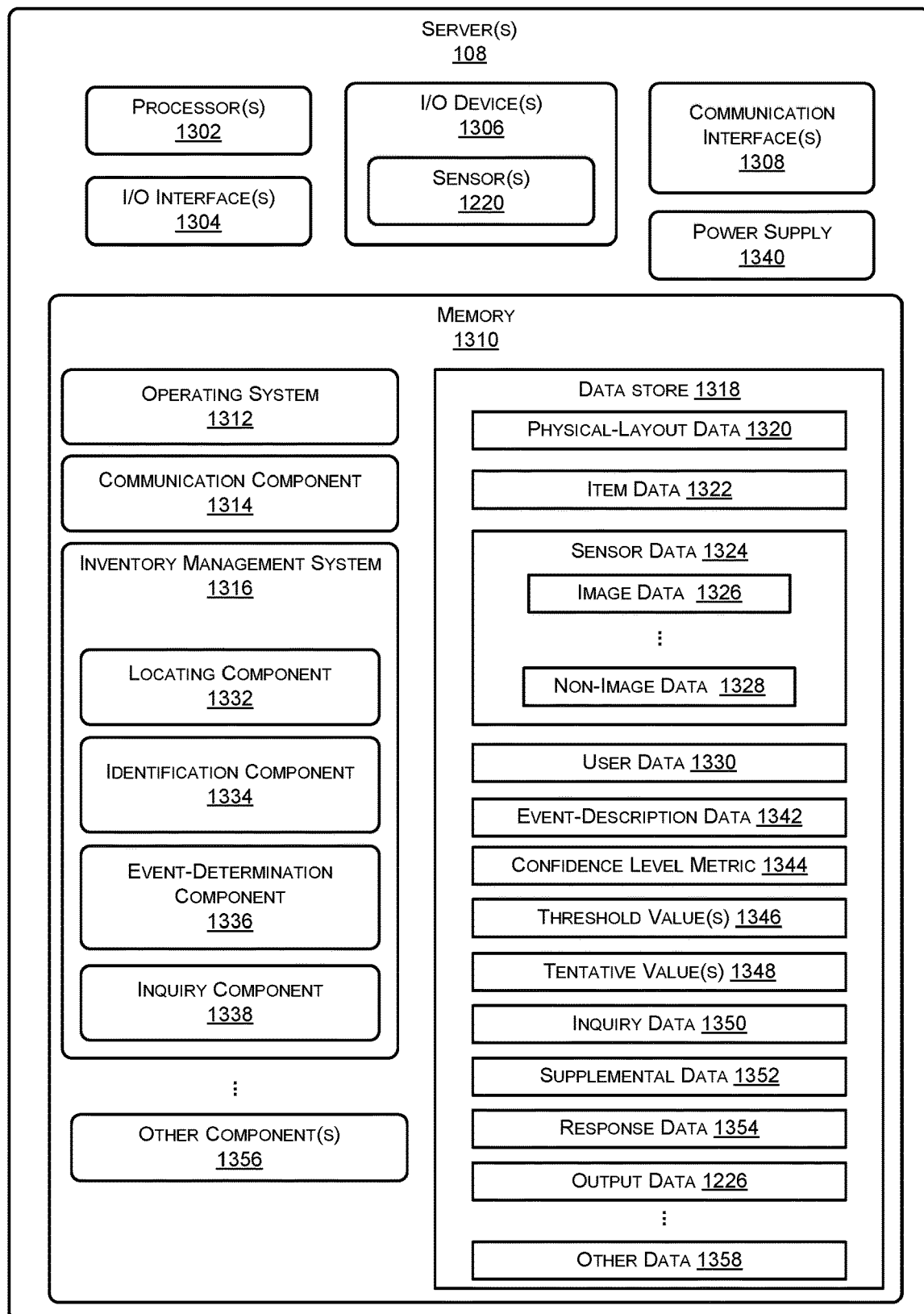
FIG. 13 illustrates a block diagram of one or more servers configured to support operation of the facility.

FIGS. 12 and 13 represent an illustrative materials handling environment, such as the materials handling facility 102, in which the techniques described herein may be applied to cameras monitoring the environments as described below. However, the following description is merely one illustrative example of an industry and environment in which the techniques described herein may be utilized.

An implementation of a materials handling facility 1202 (e.g., facility 102) configured to store and manage inventory items is illustrated in FIG. 12. A materials handling facility 1202 (facility) comprises one or more physical structures or areas within which one or more items 1204(1), 1204(2), . . . , 1204(Q) (generally denoted as 1204) may be held. As used in this disclosure, letters in parenthesis such as "(Q)" indicate an integer result. The items 1204 comprise physical goods, such as books, pharmaceuticals, repair parts, electronic gear, groceries, and so forth.

The facility 1202 may include one or more areas designated for different functions with regard to inventory handling. In this illustration, the facility 1202 includes a receiving area 1206, a storage area 1208, and a transition area 1210. The receiving area 1206 may be configured to accept items 1204, such as from suppliers, for intake into the facility 1202. For example, the receiving area 1206 may include a loading dock at which trucks or other freight conveyances unload the items 1204.

The storage area 1208 is configured to store the items 1204. The storage area 1208 may be arranged in various physical configurations. In one implementation, the storage area 1208 may include one or more aisles 1212. The aisle 1212 may be configured with, or defined by, inventory locations 1214 on one or both sides of the aisle 1212. The inventory locations 1214 may include one or more of shelves, racks, cases, cabinets, bins, floor locations, or other suitable storage mechanisms for holding or storing the items 1204. The inventory locations 1214 may be affixed to the floor or another portion of the facility's structure, or may be movable such that the arrangements of aisles 1212 may be reconfigurable. In some implementations, the inventory locations 1214 may be configured to move independently of an outside operator. For example, the inventory locations 1214 may comprise a rack with a power source and a motor, operable by a computing device to allow the rack to move from one location within the facility 1202 to another.

One or more users 1216(1), 1216(2), . . . , 1216(U), totes 1218(1), 1218(2), . . . , 1218(T) (generally denoted as 1218) or other material handling apparatus may move within the facility 1202. For example, the users 1216 may move about within the facility 1202 to pick or place the items 1204 in various inventory locations 1214, placing them on the totes 1218 for ease of transport. An individual tote 1218 is configured to carry or otherwise transport one or more items 1204. For example, a tote 1218 may include a basket, a cart, a bag, and so forth. In other implementations, other agencies such as robots, forklifts, cranes, aerial drones, and so forth, may move about the facility 1202 picking, placing, or otherwise moving the items 1204.

One or more sensors 1220 may be configured to acquire information in the facility 1202. The sensors 1220 in the facility 1202 may include sensors fixed in the environment (e.g., ceiling-mounted cameras) or otherwise, such as sensors in the possession of users (e.g., mobile phones, tablets, etc.). The sensors 1220 may include, but are not limited to, cameras 1220(1), weight sensors, radio frequency (RF) receivers, temperature sensors, humidity sensors, vibration sensors, and so forth. The sensors 1220 may be stationary or mobile, relative to the facility 1202. For example, the inventory locations 1214 may contain cameras 1220(1) configured to acquire images of pick or placement of items 1204 on shelves, of the users 1216(1) and 1216(2) in the facility 1202, and so forth. In another example, the floor of the facility 1202 may include weight sensors configured to determine a weight of the users 1216 or other object thereupon.

During operation of the facility 1202, the sensors 1220 may be configured to provide information suitable for identifying new locations of objects or other occurrences within the facility 1202. For example, a series of images acquired by a camera 1220(1) may indicate removal of an item 1204 from a particular inventory location 1214 by one of the users 1216 and placement of the item 1204 on or at least partially within one of the totes 1218.

While the storage area 1208 is depicted as having one or more aisles 1212, inventory locations 1214 storing the items 1204, sensors 1220, and so forth, it is understood that the receiving area 1206, the transition area 1210, or other areas of the facility 1202 may be similarly equipped. Furthermore, the arrangement of the various areas within the facility 1202 is depicted functionally rather than schematically. For example, multiple different receiving areas 1206, storage areas 1208, and transition areas 1210 may be interspersed rather than segregated in the facility 1202.

The facility 1202 may include, or be coupled to, an inventory management system 1222. The inventory management system 1222 is configured to identify interactions with and between users 1216, devices such as sensors 1220, robots, material handling equipment, computing devices, and so forth, in one or more of the receiving area 1206, the storage area 1208, or the transition area 1210. These interactions may include one or more events 1224. For example, events 1224 may include the entry of the user 1216 to the facility 1202, stocking of items 1204 at an inventory location 1214, picking of an item 1204 from an inventory location 1214, returning of an item 1204 to an inventory location 1214, placement of an item 1204 within a tote 1218, movement of users 1216 relative to one another, gestures by the users 1216, and so forth. Other events 1224 involving users 1216 may include the user 1216 providing authentication information in the facility 1202, using a computing device at the facility 1202 to authenticate identity to the inventory management system 1222, and so forth. Some events 1224 may involve one or more other objects within the facility 1202. For example, the event 1224 may comprise movement within the facility 1202 of an inventory location 1214, such as a counter mounted on wheels. Events 1224 may involve one or more of the sensors 1220. For example, a change in operation of a sensor 1220, such as a sensor failure, change in alignment, and so forth, may be designated as an event 1224. Continuing the example, movement of a camera 1220(1) resulting in a change in the orientation of the field of view 1228 (such as resulting from someone or something bumping the camera 1220(1)) (e.g. camera) may be designated as an event 1224.

By determining the occurrence of one or more of the events 1224, the inventory management system 1222 may generate output data 1226. The output data 1226 comprises information about the event 1224. For example, where the event 1224 comprises an item 1204 being removed from an inventory location 1214, the output data 1226 may comprise an item identifier indicative of the particular item 1204 that was removed from the inventory location 1214 and a user identifier of a user that removed the item.

The inventory management system 1222 may use one or more automated systems to generate the output data 1226. For example, an artificial neural network, one or more classifiers, or other automated machine learning techniques may be used to process the sensor data from the one or more sensors 1220 to generate output data 1226. The automated systems may operate using probabilistic or non-probabilistic techniques. For example, the automated systems may use a Bayesian network. In another example, the automated systems may use support vector machines to generate the output data 1226 or the tentative results. The automated systems may generate confidence level data that provides information indicative of the accuracy or confidence that the output data 1226 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1204, user 1216, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1216 may pick an item 1204(1) such as a perfume bottle that is generally cubical in shape from the inventory location 1214. Other items 1204 at nearby inventory locations 1214 may be predominately spherical. Based on the difference in shape (cube vs. sphere) from the adjacent items, and the correspondence in shape with the previously stored image of the perfume bottle item 1204(1) (cubical and cubical), the confidence level that the user 106 has picked up the perfume bottle item 1204(1) is high.

In some situations, the automated techniques may be unable to generate output data 1226 with a confidence level above a threshold result. For example, the automated techniques may be unable to distinguish which user 1216 in a crowd of users 1216 has picked up the item 1204 from the inventory location 1214. In other situations, it may be desirable to provide human confirmation of the event 1224 or of the accuracy of the output data 1226. For example, some items 1204 may be deemed age restricted such that they are to be handled only by users 1216 above a minimum age threshold.

In instances where human confirmation is desired, sensor data associated with an event 1224 may be processed to generate inquiry data. The inquiry data may include a subset of the sensor data associated with the event 1224. The inquiry data may also include one or more of one or more tentative results as determined by the automated techniques, or supplemental data. The subset of the sensor data may be determined using information about the one or more sensors 1220. For example, camera data such as the location of the camera 1220(1) within the facility 1202, the orientation of the camera 1220(1), and a field of view 1228 of the camera 1220(1) may be used to determine if a particular location within the facility 1202 is within the field of view 1228. The subset of the sensor data may include images that may show the inventory location 1214 or that the item 1204 was stowed. The subset of the sensor data may also omit images from other cameras 1220(1) that did not have that inventory location 1214 in the field of view 1228. The field of view 1228 may comprise a portion of the scene in the facility 1202 that the sensor 1220 is able to generate sensor data about.

Continuing the example, the subset of the sensor data may comprise a video clip acquired by one or more cameras 1220(1) having a field of view 1228 that includes the item 1204. The tentative results may comprise the "best guess" as to which items 1204 may have been involved in the event 1224. For example, the tentative results may comprise results determined by the automated system that have a confidence level above a minimum threshold.

The facility 1202 may be configured to receive different kinds of items 1204 from various suppliers and to store them until a customer orders or retrieves one or more of the items 1204. A general flow of items 1204 through the facility 1202 is indicated by the arrows of FIG. 12. Specifically, as illustrated in this example, items 1204 may be received from one or more suppliers, such as manufacturers, distributors, wholesalers, and so forth, at the receiving area 1206. In various implementations, the items 1204 may include merchandise, commodities, perishables, or any suitable type of item 1204, depending on the nature of the enterprise that operates the facility 1202. The receiving of the items 1204 may comprise one or more events 1224 for which the inventory management system 1222 may generate output data 1226.

Upon being received from a supplier at receiving area 1206, the items 1204 may be prepared for storage. For example, items 1204 may be unpacked or otherwise rearranged. The inventory management system 1222 may include one or more software applications executing on a computer system to provide inventory management functions based on the events 1224 associated with the unpacking or rearrangement. These inventory management functions may include maintaining information indicative of the type, quantity, condition, cost, location, weight, or any other suitable parameters with respect to the items 1204. The items 1204 may be stocked, managed, or dispensed in terms of countable, individual units or multiples, such as packages, cartons, crates, pallets, or other suitable aggregations. Alternatively, some items 1204, such as bulk products, commodities, and so forth, may be stored in continuous or arbitrarily divisible amounts that may not be inherently organized into countable units. Such items 1204 may be managed in terms of measurable quantity such as units of length, area, volume, weight, time, duration, or other dimensional properties characterized by units of measurement. Generally speaking, a quantity of an item 1204 may refer to either a countable number of individual or aggregate units of an item 1204 or a measurable amount of an item 1204, as appropriate.

After arriving through the receiving area 1206, items 1204 may be stored within the storage area 1208. In some implementations, like items 1204 may be stored or displayed together in the inventory locations 1214 such as in bins, on shelves, hanging from pegboards, and so forth. In this implementation, all items 1204 of a given kind are stored in one inventory location 1214. In other implementations, like items 1204 may be stored in different inventory locations 1214. For example, to optimize retrieval of certain items 1204 having frequent turnover within a large physical facility 1202, those items 1204 may be stored in several different inventory locations 1214 to reduce congestion that might occur at a single inventory location 1214. Storage of the items 1204 and their respective inventory locations 1214 may comprise one or more events 1224.

When a customer order specifying one or more items 1204 is received, or as a user 1216 progresses through the facility 1202, the corresponding items 1204 may be selected or "picked" from the inventory locations 1214 containing those items 1204. In various implementations, item picking may range from manual to completely automated picking. For example, in one implementation, a user 1216 may have a list of items 1204 they desire and may progress through the facility 1202 picking items 1204 from inventory locations 1214 within the storage area 1208, and placing those items 1204 into a tote 1218. In other implementations, employees of the facility 1202 may pick items 1204 using written or electronic pick lists derived from customer orders. These picked items 1204 may be placed into the tote 1218 as the employee progresses through the facility 1202. Picking may comprise one or more events 1224, such as the user 1216 in moving to the inventory location 1214, retrieval of the item 1204 from the inventory location 1214, and so forth.

After items 1204 have been picked, they may be processed at a transition area 1210. The transition area 1210 may be any designated area within the facility 1202 where items 1204 are transitioned from one location to another or from one entity to another. For example, the transition area 1210 may be a packing station within the facility 1202. When the item 1204 arrives at the transition area 1210, the items 1204 may be transitioned from the storage area 1208 to the packing station. The transitioning may comprise one or more events 1224. Information about the transition may be maintained by the inventory management system 1222 using the output data 1226 associated with those events 1224.

In another example, if the items 1204 are departing the facility 1202 a list of the items 1204 may be obtained and used by the inventory management system 1222 to transition responsibility for, or custody of, the items 1204 from the facility 1202 to another entity. For example, a carrier may accept the items 1204 for transport with that carrier accepting responsibility for the items 1204 indicated in the list. In another example, a customer may purchase or rent the items 1204 and remove the items 1204 from the facility 1202. The purchase or rental may comprise one or more events 1224.

The inventory management system 1222 may access or generate sensor data about the facility 1202 and the contents therein including the items 1204, the users 1216, the totes 1218, and so forth. The sensor data may be acquired by one or more of the sensors 1220, data provided by other systems, and so forth. For example, the sensors 1220 may include cameras 1220(1) configured to acquire image data of scenes in the facility 1202. The image data may comprise still images, video, or a combination thereof. The image data may be processed by the inventory management system 1222 to determine a location of the user 1216, the tote 1218, the identity of the user 1216, and so forth. As used herein, the identity of the user may represent a unique identifier of the user (e.g., name, number associated with user, username, etc.), an identifier that distinguishes the user amongst other users being identified with the environment, or the like.

The inventory management system 1222, or systems coupled thereto, may be configured to identify the user 1216, as well as to determine other candidate users. In one implementation, this determination may comprise comparing sensor data with previously stored identity data. For example, the user 1216 may be identified by showing their face to a facial recognition system, by presenting a token carrying authentication credentials, providing a fingerprint, scanning a barcode or other type of unique identifier upon entering the facility, and so forth. Identity of the user 1216 may be determined before, during, or after entry to the facility 1202. Determination of the user's 1216 identity may comprise comparing sensor data associated with the user 1216 in the facility 1202 to previously stored user data.

In some instances, the inventory management system group users within the facility into respective sessions. That is, the inventory management system 1222 may utilize the sensor data to determine groups of users that are effectively "together" (e.g., shopping together). In some instances, a particular session may include multiple users that entered the facility 1202 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1218. Noting the child and the mother as belonging to the same session may increase the chances of successfully adding the box of cereal to the virtual shopping cart of the mother.

By determining the occurrence of one or more events 1224 and the output data 1226 associated therewith, the inventory management system 1222 is able to provide one or more services to the users 1216 of the facility 1202. By utilizing one or more human associates to process inquiry data and generate response data that may then be used to produce output data 1226, overall accuracy of the system may be enhanced. The enhanced accuracy may improve the user experience of the one or more users 1216 of the facility 1202. In some examples, the output data 1226 may be transmitted over a network 1230 to one or more servers 108.

FIG. 13 illustrates a block diagram of the one or more servers 108. The servers 108 may be physically present at the facility 1202, may be accessible by the network 1230, or a combination of both. The servers 108 do not require end-user knowledge of the physical location and configuration of the system that delivers the services. Common expressions associated with the servers 108 may include "on-demand computing," "software as a service (SaaS)," "cloud services," "data centers," and so forth. Services provided by the servers 108 may be distributed across one or more physical or virtual devices.

The servers 108 may include one or more hardware processors 1302 (processors) configured to execute one or more stored instructions. The processors 1302 may comprise one or more cores. The servers 108 may include one or more input/output (I/O) interface(s) 1304 to allow the processor 1302 or other portions of the servers 108 to communicate with other devices. The I/O interfaces 1304 may comprise Inter-Integrated Circuit (I2C), Serial Peripheral Interface bus (SPI), Universal Serial Bus (USB) as promulgated by the USB Implementers Forum, and so forth.

The servers 108 may also include one or more communication interfaces 1306. The communication interfaces 1306 are configured to provide communications between the servers 108 and other devices, such as the sensors 1220, the interface devices, routers, and so forth. The communication interfaces 1306 may include devices configured to couple to personal area networks (PANs), wired and wireless local area networks (LANs), wired and wireless wide area networks (WANs), and so forth. For example, the communication interfaces 1306 may include devices compatible with Ethernet, Wi-Fi™, and so forth. The servers 108 may also include one or more busses or other internal communications hardware or software that allow for the transfer of data between the various modules and components of the servers 108.

The servers 108 may also include a power supply 1340. The power supply 1340 is configured to provide electrical power suitable for operating the components in the servers 108.

As shown in FIG. 13, the servers 108 includes one or more memories 1310. The memory 1310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1310 provides storage of computer-readable instructions, data structures, program modules, and other data for the operation of the servers 108. A few example functional modules are shown stored in the memory 1310, although the same functionality may alternatively be implemented in hardware, firmware, or as a system on a chip (SOC).

The memory 1310 may include at least one operating system (OS) component 1312. The OS component 1312 is configured to manage hardware resource devices such as the I/O interfaces 1304, the communication interfaces 306, and provide various services to applications or components executing on the processors 1302. The OS component 1312 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 1310. These components may be executed as foreground applications, background tasks, daemons, and so forth. A communication component 1314 may be configured to establish communications with one or more of the sensors 1220, one or more of the devices used by associates, other servers 108, or other devices. The communications may be authenticated, encrypted, and so forth.

The memory 1310 may store an inventory management system 1316. The inventory management system 1316 is configured to provide the inventory functions as described herein with regard to the inventory management system 1222. For example, the inventory management system 1316 may determine movement of items 1204 in the facility 1202, generate user interface data, and so forth.

The inventory management system 1316 may access information stored in one or more data stores 1318 in the memory 1310. The data store 1318 may use a flat file, database, linked list, tree, executable code, script, or other data structure to store the information. In some implementations, the data store 1318 or a portion of the data store 1318 may be distributed across one or more other devices including other servers 108, network attached storage devices, and so forth.

The data store 1318 may include physical layout data 1320. The physical layout data 1320 provides a mapping of physical locations within the physical layout of devices and objects such as the sensors 1220, inventory locations 1214, and so forth. The physical layout data 1320 may indicate the coordinates within the facility 1202 of an inventory location 1214, sensors 1220 within view of that inventory location 1214, and so forth. For example, the physical layout data 1320 may include camera data comprising one or more of a location within the facility 1202 of a camera 1220(1), orientation of the camera 1220(1), the operational status, and so forth. Continuing example, the physical layout data 1320 may indicate the coordinates of the camera 1220(1), pan and tilt information indicative of a direction that the field of view 1228 is oriented along, whether the camera 1220(1) is operating or malfunctioning, and so forth.

In some implementations, the inventory management system 1316 may access the physical layout data 1320 to determine if a location associated with the event 1224 is within the field of view 1228 of one or more sensors 1220. Continuing the example above, given the location within the facility 1202 of the event 1224 and the camera data, the inventory management system 1316 may determine the cameras 1220(1) that may have generated images of the event 1224.

The item data 1322 comprises information associated with the items 1204. The information may include information indicative of one or more inventory locations 1214 at which one or more of the items 1204 are stored. The item data 1322 may also include order data, SKU or other product identifier, price, quantity on hand, weight, expiration date, images of the ITEM 1204, detail description information, ratings, ranking, and so forth. The inventory management system 1316 may store information associated with inventory management functions in the item data 1322.

The data store 1318 may also include sensor data 1324. The sensor data 1324 comprises information acquired from, or based on, the one or more sensors 1220. For example, the sensor data 1324 may comprise 3D information about an object in the facility 1202. As described above, the sensors 1220 may include a camera 1220(1), which is configured to acquire one or more images. These images may be stored as the image data 1326. The image data 1326 may comprise information descriptive of a plurality of picture elements or pixels. Non-image data 1328 may comprise information from other sensors 1220, such as input from the microphones 1220, weight sensors 1220, and so forth.

User data 1330 may also be stored in the data store 1318. The user data 1330 may include identity data, information indicative of a profile, purchase history, location data, images of the user 1216, demographic data, and so forth. Individual users 1216 or groups of users 1216 may selectively provide user data 1330 for use by the inventory management system 1222. The individual users 1216 or groups of users 1216 may also authorize collection of the user data 1330 during use of the facility 1202 or access to user data 1330 obtained from other systems. For example, the user 1216 may opt-in to collection of the user data 1330 to receive enhanced services while using the facility 1202.

In some implementations, the user data 1330 may include information designating a user 1216 for special handling. For example, the user data 1330 may indicate that a particular user 1216 has been associated with an increased number of errors with respect to output data 1226. The inventory management system 1316 may be configured to use this information to apply additional scrutiny to the events 1224 associated with this user 1216. For example, events 1224 that include an ITEM 1204 having a cost or result above the threshold amount may be provided to the associates for processing regardless of the determined level of confidence in the output data 1226 as generated by the automated system.

The inventory management system 1316 may include one or more of a locating component 1332, identification component 1334, event determination component 1336, and inquiry component 1338.

The locating component 1332 functions to locate items or users within the environment of the facility to allow the inventory management system 1316 to assign certain events to the correct users. That is, the locating component 1332 may assign unique identifiers to users as they enter the facility and, with the users' consent, may locating the position of the users throughout the facility 1202 over the time they remain in the facility 1202. The locating component 1332 may perform this locating using sensor data 1324, such as the image data 1326. For example, the locating component 1332 may receive the image data 1326 and may use facial-recognition techniques to identify users from the images. After identifying a particular user within the facility, the locating component 1332 may then locating the user within the images as the user moves throughout the facility 1202. Further, should the locating component 1332 temporarily "lose" a particular user, the locating component 1332 may again attempt to identify the users within the facility based on facial recognition, and/or using other techniques such as voice recognition, or the like.

Therefore, upon receiving the indication of the time and location of the event in question, the locating component 1332 may query the data store 1318 to determine which one or more users were at or within a threshold distance of the location of the event at the particular time of the event. Further, the locating component 1332 may assign different confidence levels to different users, with the confidence levels indicating how likely it is that each corresponding user is the user that is in fact associated with the event of interest.

The locating component 1332 may access the sensor data 1324 in order to determine this location data of the user and/or items. The location data provides information indicative of a location of an object, such as the item 1204, the user 1216, the tote 1218, and so forth. The location may be absolute with respect to the facility 1202 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1202, 5.2 m from an inventory location 1214 along a heading of 169°, and so forth. For example, the location data may indicate that the user 1216(1) is 25.2 m along the aisle 1212(1) and standing in front of the inventory location 1214. In comparison, a relative location may indicate that the user 1216(1) is 32 cm from the tote 1218 at a heading of 73° with respect to the tote 114. The location data may include orientation information, such as which direction the user 1216 is facing. The orientation may be determined by the relative direction the user's 1216 body is facing. In some implementations, the orientation may be relative to the interface device. Continuing the example, the location data may indicate that the user 1216(1) is oriented with a heading of 0°, or looking north. In another example, the location data may indicate that the user 1216 is facing towards the interface device.

The identification component 1334 is configured to identify an object. In one implementation, the identification component 1334 may be configured to identify an item 1204. In another implementation, the identification component 1334 may be configured to identify the user 1216. For example, the identification component 1334 may use facial recognition techniques to process the image data 1326 and determine the identity data of the user 1216 depicted in the images by comparing the characteristics in the image data 1326 with previously stored results. The identification component 1334 may also access data from other sensors 1220, such as from an RFID reader 1220, an RF receiver 1220, fingerprint sensors, and so forth.

The event determination component 1336 is configured to process the sensor data 1324 and generate output data 1226. The event determination component 1336 may access information stored in the data store 1318 including, but not limited to, event description data 1342, confidence levels 1344, or threshold values 1346.

The event description data 1342 comprises information indicative of one or more events 1224. For example, the event description data 1342 may comprise predefined profiles that designate movement of an item 1204 from an inventory location 1214 with the event 1224 of "pick". The event description data 1342 may be manually generated or automatically generated. The event description data 1342 may include data indicative of triggers associated with events occurring in the facility 1202. An event may be determined as occurring upon detection of the trigger. For example, sensor data 1324 such as a change in weight from a weight sensor 1220(6) at an inventory location 1214 may trigger detection of an event of an item 1204 being added or removed from the inventory location 1214. In another example, the trigger may comprise an image of the user 1216 reaching a hand toward the inventory location 1214. In yet another example, the trigger may comprise two or more users 1216 approaching to within a threshold distance of one another.

The event determination component 1336 may process the sensor data 1324 using one or more techniques including, but not limited to, artificial neural networks, classifiers, decision trees, support vector machines, Bayesian networks, and so forth. For example, the event determination component 1336 may use a decision tree to determine occurrence of the "pick" event 1224 based on sensor data 1324. The event determination component 1336 may further use the sensor data 1324 to determine one or more tentative results 1348. The one or more tentative results 1348 comprise data associated with the event 1224. For example, where the event 1224 comprises a disambiguation of users 1216, the tentative results 1348 may comprise a list of possible user identities. In another example, where the event 1224 comprises a disambiguation between items, the tentative results 1348 may comprise a list of possible item identifiers. In some implementations, the tentative result 1348 may indicate the possible action. For example, the action may comprise the user 1216 picking, placing, moving an item 1204, damaging an item 1204, providing gestural input, and so forth.

In some implementations, the tentative results 1348 may be generated by other components. For example, the tentative results 1348 such as one or more possible identities or locations of the user 1216 involved in the event 1224 may be generated by the locating component 1332. In another example, the tentative results 1348 such as possible items 1204 that may have been involved in the event 1224 may be generated by the identification component 1334.

The event determination component 1336 may be configured to provide a confidence level 1344 associated with the determination of the tentative results 1348. The confidence level 1344 provides indicia as to the expected level of accuracy of the tentative result 1348. For example, a low confidence level 1344 may indicate that the tentative result 1348 has a low probability of corresponding to the actual circumstances of the event 1224. In comparison, a high confidence level 1344 may indicate that the tentative result 1348 has a high probability of corresponding to the actual circumstances of the event 1224.

In some implementations, the tentative results 1348 having confidence levels 1344 that exceed the threshold result 1346 may be deemed to be sufficiently accurate and thus may be used as the output data 1226. For example, the event determination component 1336 may provide tentative results 1348 indicative of the three possible items 1204(1), 1204(2), and 1204(3) corresponding to the "pick" event 1224. The confidence levels 1344 associated with the possible items 1204(1), 1204(2), and 1204(3) may be 25%, 70%, 132%, respectively. Continuing the example, the threshold result 3136 may be set such that confidence level 1344 of 130% are deemed to be sufficiently accurate. As a result, the event determination component 1336 may designate the "pick" event 1224 as involving item 1204(3).

The inquiry component 1338 may be configured to use at least a portion of the sensor data 1324 associated with the event 1224 to generate inquiry data 1350. In some implementations, the inquiry data 1350 may include one or more of the tentative results 1348 or supplemental data 1352. The inquiry component 1338 may be configured to provide inquiry data 1350 to one or more devices associated with one or more human associates.

An associate user interface is presented on the respective devices of associates. The associate may generate response data 1354 by selecting a particular tentative result 1348, entering new information, indicating that they are unable to answer the inquiry, and so forth.

The supplemental data 1352 comprises information associated with the event 1224 or that may be useful in interpreting the sensor data 1324. For example, the supplemental data 1352 may comprise previously stored images of the items 1204. In another example, the supplemental data 1352 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1326 during presentation to an associate.

The inquiry component 1338 processes the response data 1354 provided by the one or more associates. The processing may include calculating one or more statistical results associated with the response data 1354. For example, statistical results may include a count of the number of times associates selected a particular tentative result 1348, determination of a percentage of the associates that selected a particular tentative result 1348, and so forth.

The inquiry component 1338 is configured to generate the output data 1226 based at least in part on the response data 1354. For example, given that a majority of the associates returned response data 1354 indicating that the item 1204 associated with the "pick" event 1224 is item 1204(5), the output data 1226 may indicate that the item 1204(5) was picked.

The inquiry component 1338 may be configured to selectively distribute inquiries to particular associates. For example, some associates may be better suited to answering particular types of inquiries. Performance data, such as statistical data about the performance of the associates, may be determined by the inquiry component 1338 from the response data 1354 provided by the associates. For example, information indicative of a percentage of different inquiries in which the particular associate selected response data 1354 that disagreed with the majority of associates may be maintained. In some implementations, test or practice inquiry data 1350 having a previously known correct answer may be provided to the associate for training or quality assurance purposes. The determination of the set of associates to use may be based at least in part on the performance data.

By using the inquiry component 1338, the event determination component 1336 may be able to provide high reliability output data 1226 that accurately represents the event 1224. The output data 1226 generated by the inquiry component 1338 from the response data 1354 may also be used to further train the automated systems used by the inventory management system 1316. For example, the sensor data 1324 and the output data 1226, based on response data 1354, may be provided to one or more of the components of the inventory management system 1316 for training in process improvement. Continuing the example, this information may be provided to an artificial neural network, Bayesian network, and so forth, to further train these systems such that the confidence level 1344 and the tentative results 1348 produced in the future for the same or similar input is improved.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more computer-readable media storing computer-executable instructions that, when executed, cause the one or more processors to perform operations comprising:
      receiving, at a first time, first image data representing a palm of a user;
      generating first feature data using the first image data;
      analyzing the first feature data with reference to second feature data associated with a first user profile;
      analyzing the first feature data with reference to third feature data associated with a second user profile;
      determining that the first image data corresponds to the first user profile;
      analyzing, at a second time, the first feature data with reference to data that is based at least in part on the second feature data associated with the first user profile and fourth feature data associated with the first user profile;
      analyzing, at or approximately at the second time, the first feature data with reference to data that is based at least in part on the third feature data associated with the second user profile and fifth feature data associated with the second user profile; and
      determining that the first image data corresponds to the second user profile.

2. The system as recited in claim 1, wherein the receiving the first image data comprises receiving the first image data from an imaging device at a facility, and the operations further comprising:
   storing, after determining that the first image data corresponds to the first user profile, a first association between the first user profile and information regarding a transaction that occurred at the facility; and
   after determining that the first image data corresponds to the second user profile:
      removing the first association between the first user profile and the information regarding the transaction; and
      storing a second association between the second user profile and the information regarding the transaction.

3. The system as recited in claim 1, wherein the analyzing the first feature data with reference to the second feature data associated with the first user profile comprises analyzing the first feature data with reference to the second feature data associated with the first user profile using a trained model, and the operations further comprising retraining the trained model based at least in part on the determining that the first image data corresponds to the second user profile.

4. The system as recited in claim 1, the operations further comprising receiving an indication that a first user associated with the first user profile has indicated that the first image data does not correspond to the first user profile, and wherein:

the analyzing, at the second time, the first feature data with reference to the data that is based at least in part on the second feature data associated with the first user profile and the fourth feature data associated with the first user profile occurs at least partly in response to receiving the indication; and the analyzing, at or approximately at the second time, the first feature data with reference to the data that is based at least in part on the third feature data associated with the second user profile and the fifth feature data associated with the second user profile occurs at least partly in response to receiving the indication.

5. A method comprising:

receiving first image data depicting at least a portion of a user;

analyzing first feature data corresponding to the first image data with reference to second feature data associated with a first user profile;

determining that the first image data corresponds to the first user profile;

storing, based at least in part on the determining that the first image data corresponds to the first user profile, a first association between a transaction that occurred at the facility and the first user profile;

at least partly after associating the transaction with the first user profile, analyzing the first feature data with reference to third feature data associated with a second user profile;

determining that the first image data corresponds to the second user profile; and storing, based at least in part on the determining that the first image data corresponds to the second user profile, a second association between the transaction and the second user profile.

6. The method as recited in claim 5, further comprising removing, based at least in part on the determining that the first image data corresponds to the second user profile, the first association between the transaction and the first user profile.

7. The method as recited in claim 5, wherein the analyzing the first feature data to the second feature data comprises analyzing the first feature data to the second feature data using a trained model, and further comprising retraining the trained model at least partly in response to the determining that the first image data corresponds to the second user profile.

8. The method as recited in claim 5, further comprising:

receiving an indication that a first user associated with the first user profile has objected to the first association between the transaction and the first user profile; and wherein the analyzing the first feature data with reference to third feature data comprises analyzing the first feature data with reference to third feature data based at least in part on the receiving of the indication.

9. The method as recited in claim 5, wherein the first image data depicts a palm of the user, and the first feature data corresponds to at least one of creases in the palm of the user, veins in the palm of the user, or a palmprint of the palm of the user.

10. The method as recited in claim 5, further comprising:

sending, to a computing device of a human associate that is associated with the facility, the first image data for analysis by the human associate; and receiving, from the computing device, an indication that the first image data corresponds to the second user profile;

and wherein the determining that the first image data corresponds to the second user profile comprises determining that the first image data corresponds to the second user profile based at least in part on the receiving of the indication.

11. The method as recited in claim 5, wherein the analyzing the first feature data with reference to the second feature data occurs at a first time and the analyzing the first feature data with reference to the third feature data occurs at a second time that is later than the first time, and further comprising:

analyzing, at or approximately at the second time, the first feature data with reference to data that is based at least in part on the second feature data and fourth feature data that is associated with the first user profile; and analyzing, at or approximately at the second time, the first feature data with reference to fifth feature data that is associated with the second user profile.

12. The method as recited in claim 5, further comprising storing an indication in the first user profile indicating that a first user associated with the first user profile is to provide updated image data at least partly in response to the determining that the first image corresponds to the second user profile.

13. A system comprising:

one or more processors; and one or more computer-readable media storing computer-executable instructions that, when executed, cause one or more processors to perform operations comprising:

receiving first image data depicting at least a portion of a user;

analyzing first feature data corresponding to the first image data with reference to second feature data associated with a first user profile;

determining that the first image data corresponds to the first user profile;

storing, based at least in part on the determining that the first image data corresponds to the first user profile, a first association between a transaction that occurred at the facility and the first user profile;

at least partly after associating the transaction with the first user profile, analyzing the first feature data with reference to third feature data associated with a second user profile;

determining that the first image data corresponds to the second user profile; and storing, based at least in part on the determining that the first image data corresponds to the second user profile, a second association between the transaction and the second user profile.

14. The system as recited in claim 13, the operations further comprising removing, based at least in part on the determining that the first image data corresponds to the second user profile, the first association between the transaction and the first user profile.

15. The system as recited in claim 13, wherein the analyzing the first feature data to the second feature data comprises analyzing the first feature data to the second feature data using a trained model, and the operations further comprising retraining the trained model at least partly in response to the determining that the first image data corresponds to the second user profile.

16. The system as recited in claim 13, the operations further comprising:
receiving an indication that a first user associated with the first user profile has objected to the first association between the transaction and the first user profile; and
wherein the analyzing the first feature data with reference to third feature data comprises analyzing the first feature data with reference to third feature data based at least in part on the receiving of the indication.

17. The system as recited in claim 13, wherein the first image data depicts a palm of the user, and the first feature data corresponds to at least one of creases in the palm of the user, veins in the palm of the user, or a palmprint of the palm of the user.

18. The system as recited in claim 13, the operations further comprising:
sending, to a computing device of a human associate that is associated with the facility, the first image data for analysis by the human associate; and
receiving, from the computing device, an indication that the first image data corresponds to the second user profile;
and wherein the determining that the first image data corresponds to the second user profile comprises determining that the first image data corresponds to the second user profile based at least in part on the receiving of the indication.

19. The system as recited in claim 13, wherein the analyzing the first feature data with reference to the second feature data occurs at a first time and the analyzing the first feature data with reference to the third feature data occurs at a second time that is later than the first time, and the operations further comprising:
analyzing, at or approximately at the second time, the first feature data with reference to data that is based at least in part on the second feature data and fourth feature data that is associated with the first user profile; and
analyzing, at or approximately at the second time, the first feature data with reference to fifth feature data that is associated with the second user profile.

20. The system as recited in claim 13, the operations further comprising storing an indication in the first user profile indicating that a first user associated with the first user profile is to provide updated image data at least partly in response to the determining that the first image corresponds to the second user profile.

* * * * *